US010596059B2

(12) United States Patent
Angold et al.

(10) Patent No.: US 10,596,059 B2
(45) Date of Patent: Mar. 24, 2020

(54) DEVICE AND METHOD FOR STRENGTHENING THE ARMS OF HUMAN EXOSKELETONS

(71) Applicant: Ekso Bionics, Inc., Richmond, CA (US)

(72) Inventors: Russ Angold, American Canyon, CA (US); Nicholas Fleming, Oakland, CA (US); Emily Rogers, Cambridge, MA (US); Brett Jaeger, Oakland, CA (US); Chris Paretich, Greenbrae, CA (US)

(73) Assignee: Ekso Bionics, Inc., Richmond, CA (US)

( * ) Notice: Subject to any disclaimer, the term of this patent is extended or adjusted under 35 U.S.C. 154(b) by 0 days.

(21) Appl. No.: 16/085,296

(22) PCT Filed: Mar. 17, 2017

(86) PCT No.: PCT/US2017/022949
§ 371 (c)(1),
(2) Date: Sep. 14, 2018

(87) PCT Pub. No.: WO2017/161257
PCT Pub. Date: Sep. 21, 2017

(65) Prior Publication Data
US 2019/0350794 A1    Nov. 21, 2019

Related U.S. Application Data

(60) Provisional application No. 62/310,352, filed on Mar. 18, 2016.

(51) Int. Cl.
*A61H 1/02* (2006.01)
*B25J 9/00* (2006.01)
*B25J 9/10* (2006.01)

(52) U.S. Cl.
CPC .......... *A61H 1/0277* (2013.01); *B25J 9/0006* (2013.01); *B25J 9/104* (2013.01);
(Continued)

(58) Field of Classification Search
CPC ................... A61H 1/02; A61H 1/0277; A61H 2201/1207; A61H 2201/14;
(Continued)

(56) References Cited

U.S. PATENT DOCUMENTS 4,843,921 A    7/1989    Kremer
5,178,137 A *  1/1993    Goor .................... A61F 5/0111
                                                              601/40
(Continued)

FOREIGN PATENT DOCUMENTS

CN    200984250    12/2007
CN    104552276    4/2015

*Primary Examiner* — Christie L Bahena
(74) *Attorney, Agent, or Firm* — Diederiks & Whitelaw, PLC.

(57) ABSTRACT

An exoskeleton includes an arm brace coupled to an arm of a wearer and a tensile member connected to the arm brace. An actuator exerts a pulling force on the tensile member. The pulling force reduces a length of the tensile member between the arm brace and the actuator and causes the arm of the wearer to bend at an elbow.

19 Claims, 24 Drawing Sheets

(52) U.S. Cl.
CPC .. *A61H 2201/1207* (2013.01); *A61H 2201/14* (2013.01); *A61H 2201/165* (2013.01); *A61H 2201/1616* (2013.01); *A61H 2201/1621* (2013.01); *A61H 2201/1626* (2013.01); *A61H 2201/1638* (2013.01)

(58) Field of Classification Search
CPC .. A61H 2201/165; A61B 5/0006; B25J 9/104; A61F 5/0118; A61F 5/103; A61F 5/0123; A61F 2005/0155
See application file for complete search history.

(56) References Cited

U.S. PATENT DOCUMENTS

| | | | |
|---|---|---|---|
| 5,212,900 A * | 5/1993 | Perry | A01K 97/10 224/222 |
| 5,685,830 A * | 11/1997 | Bonutti | A61F 5/0123 601/33 |
| 5,878,500 A | 3/1999 | Emerson | |
| 2003/0223844 A1 | 12/2003 | Schiele et al. | |
| 2007/0191743 A1 | 8/2007 | McBean et al. | |
| 2007/0225620 A1 | 9/2007 | Carignan et al. | |
| 2009/0149790 A1 * | 6/2009 | Farrell | A61F 5/0118 602/20 |
| 2013/0090580 A1 | 4/2013 | Hong et al. | |
| 2015/0374573 A1 * | 12/2015 | Horst | A61H 3/00 602/16 |
| 2017/0119132 A1 | 5/2017 | Pruess et al. | |

* cited by examiner

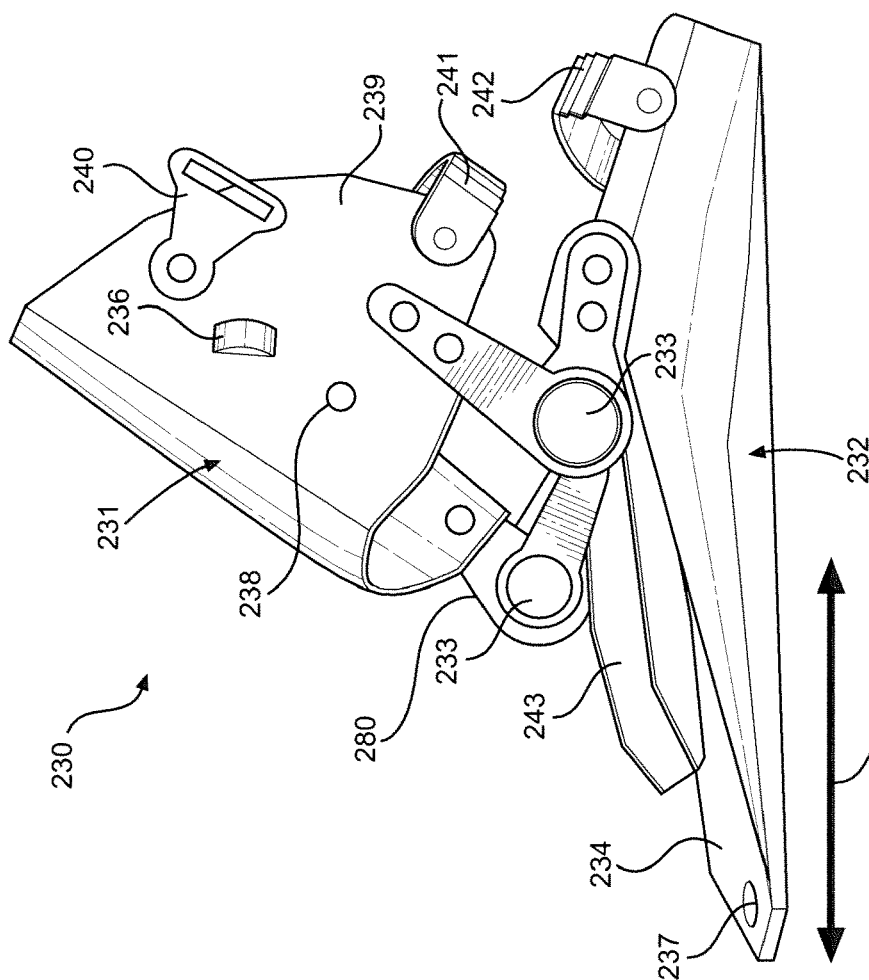
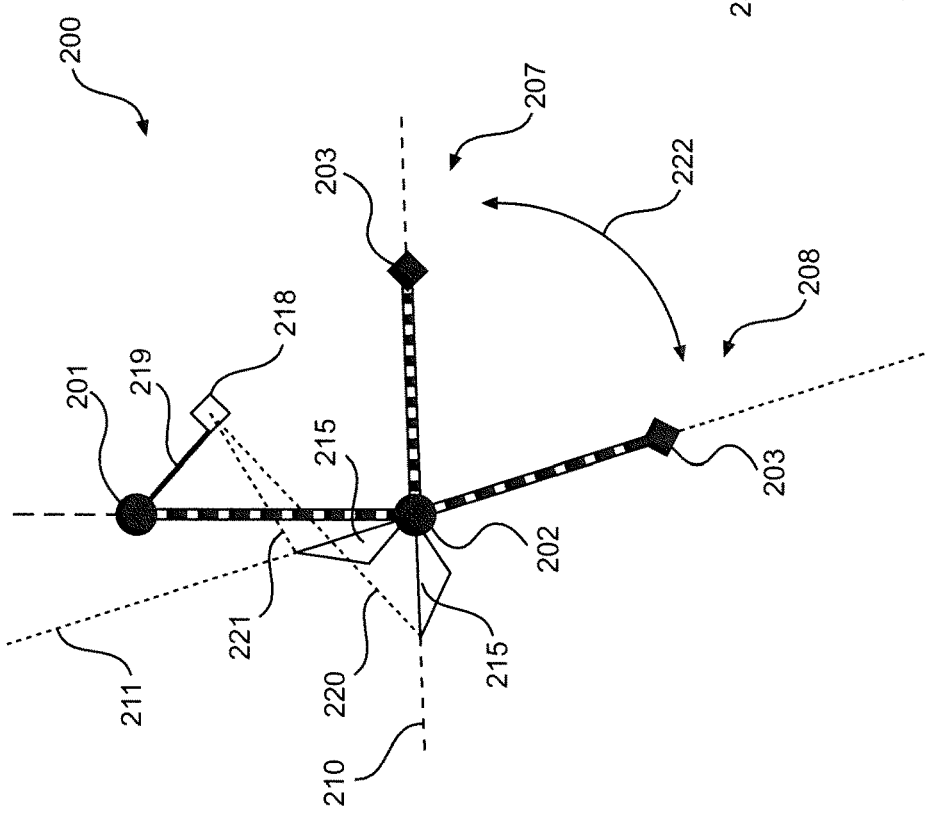
FIG. 2D
FIG. 2C

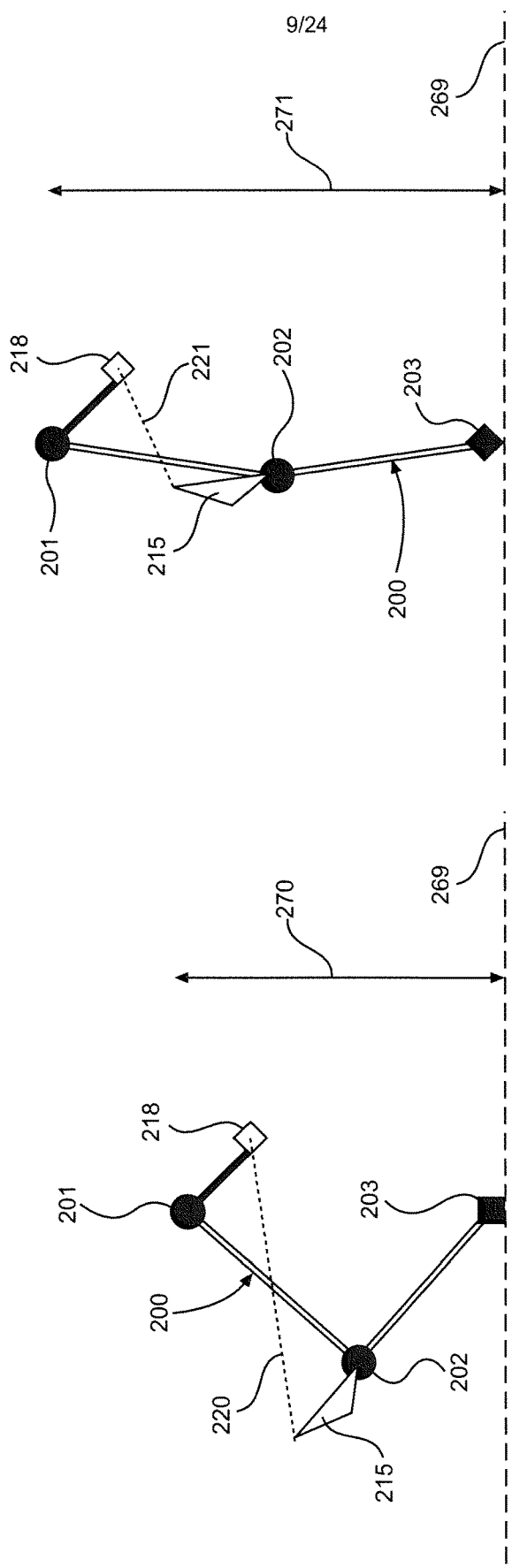

DEVICE AND METHOD FOR STRENGTHENING THE ARMS OF HUMAN EXOSKELETONS

CROSS REFERENCE TO RELATED APPLICATIONS

This application represents a National Stage Application of PCT/US2017/022949, filed Mar. 17, 2017 and titled "Device and Method for Strengthening the Arms of Human Exoskeletons", which claims the benefit of U.S. Provisional Application No. 62/310,352, which was filed on Mar. 18, 2016 and titled "Devices for Strengthening the Arms of Human Exoskeletons". The entire content of these applications are incorporated herein by reference.

GOVERNMENT LICENSE RIGHTS

This invention was made with government support under Contract H92222-15-C-0040 awarded by the United States Special Operations Command. The government has certain rights in the invention.

FIELD OF THE INVENTION

The present invention relates to devices and methods that augment a wearer's carrying capacity and strength, increasing performance and aiding in the prevention of injury during the execution of certain load-bearing or strength-requiring tasks. More particularly, the present invention relates to devices suitable for use by a person engaging in heavy tool use or weight-bearing tasks, the devices each including a set of artificial limbs, joints, and related control systems that potentiate improved function of the person's appendages for activities including, but not limited to, granting greater strength and endurance in the wearer's anus and allowing for heavy tool use over extended periods of time.

BACKGROUND OF THE INVENTION

Wearable exoskeletons have been designed for medical, commercial, and military applications. Medical exoskeletons are designed to help restore a user's mobility. Commercial and military exoskeletons are used to alleviate loads supported by workers or soldiers during strenuous activities, thereby preventing injuries and increasing the strength and stamina of these users.

In powered exoskeletons, exoskeleton control systems prescribe and control trajectories in the joints of an exoskeleton, resulting in the movement of the structure of the exoskeleton and, in some cases, the positioning of a tool supported by the exoskeleton. These control trajectories can be prescribed as position-based, force-based, or a combination of both methodologies, such as those seen in impedance controllers. Position-based control systems can be modified directly through modification of the prescribed positions. Force-based control systems can also be modified directly through modification of the prescribed force profiles. As exoskeleton users vary in proportion, variously adjusted or customized powered exoskeletons will fit each user somewhat differently. The exoskeleton control system should take into account these differences in exoskeleton user proportion, exoskeleton configuration/customization, and exoskeleton user fit to make changes to prescribed exoskeleton trajectories. The exoskeleton user can control changes in exoskeleton trajectories through communication with the exoskeleton control system through a variety of means, including, but not limited to, body pressure sensors, joysticks, touchpads, gestural sensors, voice sensors, and sensors that directly detect nervous system activity.

While the exoskeleton control system assigns trajectories to the joints of a powered exoskeleton and controls the positions of these joints, the actual forces applied to powered exoskeleton joints are exerted by actuators. These actuators can take many forms, as is known in the art, each with advantages and disadvantages in various applications. In current exoskeletons, the actuator exerting force on a joint typically consists of an electric motor located proximal to that joint. Co-location of the actuator with the joint has advantages in terms of mechanical and design simplicity, but it also has certain disadvantages. Foremost among these disadvantages is that adding a bulky electric motor to a joint increases the bulk of the joint, limiting maneuverability of the joint and exoskeleton in certain environments. In comparison, consider a human finger: the musculature exerting force on the joints of the finger is not located near the joints of the finger but rather in the forearm, with muscular contraction pulling on tendons that relay that force over distance to the joints. This has the advantage of minimizing the bulk of the fingers, allowing for both greater dexterity and closer placement of the fingers to each other. In addition, more muscle can be located in the arm than would fit on the fingers, allowing for greater strength. One mechanical actuation device, described in U.S. Pat. No. 4,843,921, uses a drive mechanism in which an electric motor twists on a loop of cord, with this cord loop forming a helical structure and shortening as it is twisted, pulling the two ends of the cord loop closer together. In this way, activation of the electric motor is used to apply a pulling force over distance through the cord loop. This allows for a design in which the motor driving the movement of a joint is located at a position distal to the joint.

Modern soldiers bring a large amount of weight with them into combat operations, including equipment, munitions, and body armor. In recent conflicts, American infantrymen have actually carried more weight than what was borne by fully-armored and armed medieval knights. This increase in carried weight has led to a number of problems, including reduced speed and increased risk of injury (including knee and back injuries), as well as difficulty standing from a prone position, climbing over objects, and dismounting from a vehicle. Exoskeleton devices, both powered and unpowered, have helped address issues relating to walking with increased weight—allowing greater carrying capacity and reducing risk of injury. However, increasing strength in the arms has been complicated by a number of factors, including the complexity of the human shoulder and wrist joints as well as the need for substantial arm dexterity in combat that would be impeded by bulky actuators affixed to the arms and shoulders. Further, heavy robotic arms would only add to the weight of a soldier (and exoskeleton), resulting in additional problems including tradeoffs relating to energy consumption and speed.

In view of the above, there exists an unmet need to provide a device that allows an exoskeleton to power the movements of the human arm, with this device providing power in such a way as to not restrict the fine motions at the shoulder. There further exists an unmet need for a device powering the movements of the human arm that does not limit arm dexterity and, more specifically, for a device that does not add substantial weight or bulk to the arms.

SUMMARY OF THE INVENTION

Disclosed herein are devices that allow for powering of the human arm at the elbow joint, allowing for increased strength by the wearer of these devices in both flexion and extension of the elbow, with the motors powering these devices being located off the arms, and with the forces being transmitted to the arms through tensile members. Additional devices are included that aid the wearer of arms powered at the elbow in climbing and lifting certain objects.

It is the primary object of the present invention to provide a device that allows for force to be applied to the arms of a person wearing the device, improving the strength of the person in flexion and extension at the elbows of that person. It is an additional object of the present invention that this device minimizes weight and bulk, particularly on the arms of the wearer, and that this device minimize impedance to the dexterity of the person wearing the device.

It is an additional object of the present invention to provide a device that allows for the weight of an object being carried in the hands/arms of the wearer to be compensated for and supported, allowing the wearer to hold heavy objects steadily and for extended periods of time with less fatigue.

It is an additional object of the present invention to provide a device that allows for the augmented arm strength imparted upon the wearer of the device to be effectively transferred around the hands of the wearer in such a way as to maximize the application of additional forces to potentiate climbing or similar activities by the wearer.

The application of power to exoskeleton arms, particularly for exoskeleton arms for use in military or emergency responder applications, is complicated by the need for dexterity in these applications. The complexity of the human shoulder presents a particular problem as it is very difficult to match the flexibility of this joint with a bulky robotic arm. Unlike the shoulder, the elbow is a relatively simple joint with generally only bi-direction over a single rotational point (flexion and extension). The present invention seeks to provide power to the elbow without mounting a motor or actuator on the elbow and without rigidly connecting an exoskeleton structure between the elbow and shoulder joint. Biomechanically, human bones act as compression members, and muscles apply forces to these bones across joints via tendons which transmit the forces from the muscles. The muscles powering the fingers are in the forearms, while the muscles powering the elbow are in the upper arm, allowing for less weight in the distal portions of the body, better weight distribution of the limbs and greater dexterity at the extremities.

Concepts and prototypes were developed to utilize an exoskeleton to provide force to human joints without the exoskeleton structure being required to rigidly connect to the joint being powered, with the forces being applied by the exoskeleton upon the joint being transferred by tensile members, and with the bones in the human limbs acting as compression members (in place of the exoskeleton structure).

Concepts and prototypes were further developed to apply force to the elbow of a person by means of an orthotic brace affixed to the upper arm and forearm of the person, with the forearm and upper arm portions of the brace being rotatably connected, with an extension from the forearm extending behind the rotational center at the elbow, with a tensile member affixed to this forearm extension being connected to a chest mounted motor or winch, and with this winch being able to shorten the length of the tensile member resulting in extension of the arm.

Concepts and prototypes were further developed to apply force to the arm of a person by means of an orthotic brace affixed to the upper arm and forearm of the person, with the forearm and upper arm portions of the brace being rotatably connected, with one or more tensile members affixed to the forearm and/or upper arm portions of the brace near the wrist, with these tensile members being routed through a shoulder guide and to a back mounted winch or spring, and with this winch or spring being able to apply force to the tensile members resulting in support of the arm and objects supported by the arm.

Concepts and prototypes were further developed to affix a glove to the forearm brace, with this glove having an inelastic material on the palm, and with this glove being connected to the forearm brace in such a way as to allow the transmission of force from the forearm brace into the glove and a surface held by the glove. A tensile member is attached near the wrist of this forearm brace, with a chest mounted winch allowing for the shortening of the tensile member, with this shortening resulting in the flexion of the arm at the elbow, and with this allowing for use of a powered elbow for climbing or lifting motions of the arms.

Concepts and prototypes were further developed to affix a hook or other tool to the forearm brace, allowing for transmission of force from the tensile member through the forearm brace into the hook or tool, and with this allowing for use of the powered elbow for climbing or lifting motions of the arms.

In particular, the present invention is directed to an exoskeleton comprising an arm brace configured to be coupled to an arm of a wearer and a tensile member connected to the arm brace. An actuator is configured to exert a pulling force on the tensile member. The pulling force reduces a length of the tensile member between the arm brace and the actuator and causes the arm of the wearer to bend at an elbow.

In one embodiment, a glove is coupled to the arm brace. The glove includes an inelastic palm structure. A first strap and a second strap connect the glove to the arm brace.

The arm brace includes an upper arm brace configured to be coupled to an upper arm of the wearer and a forearm brace configured to be coupled to a forearm of the wearer. The tensile member is connected to the forearm brace and/or the upper arm brace. In one embodiment, the forearm brace includes an elbow spur and a pulley connected to the elbow spur. The tensile member is routed through the pulley.

The exoskeleton further comprises a torso brace configured to be coupled to a torso of the wearer. The actuator is coupled to the torso brace. Preferably, the torso brace includes a chest structure and a back structure, and the actuator is located within the chest structure or the back structure. In one embodiment, the exoskeleton further comprises a tensile member guide assembly configured to guide the tensile member. The tensile member guide assembly is coupled to the torso brace. Preferably, the torso brace includes a shoulder structure, and the tensile member guide assembly is coupled to the shoulder structure. The tensile member guide assembly includes a pivoting tensile member guide body having a horizontal or vertical guide configured to contact the tensile member.

The exoskeleton further comprises a second tensile member connected to the arm brace. Exerting a pulling force on the second tensile member causes the arm of the wearer to bend at the elbow.

In one embodiment, the actuator is a winch, and the exoskeleton further comprises an electric motor configured to drive the winch. In another embodiment, the actuator is a spring.

In one embodiment, a tool is coupled to the arm brace. The tool can be a hook.

Additional objects, features and advantages of the invention will become more readily apparent from the following detailed description of preferred embodiments thereof when taken in conjunction with the drawings wherein like reference numerals refer to common parts in the several views.

BRIEF DESCRIPTION OF THE DRAWINGS

FIG. 2A shows a forearm spur, with the spur passing beyond the elbow in line with the forearm, and with the spur moving oppositely relative to the angle of the forearm to the upper arm about the elbow joint.

FIG. 2B shows a forearm spur, with the spur passing beyond the elbow in line with the forearm, and with the spur moving oppositely relative to the angle of the forearm to the upper arm about the elbow joint.

FIG. 2C is a diagram representing the primary embodiment of the present invention, showing how extension movements of the arm at the elbow can be effected by shortening the distance from the terminus of the forearm spur to a point fixed relative the shoulder.

FIG. 2D shows an arm brace of the device of the primary embodiment.

FIG. 2F is a diagram representing the primary embodiment of the present invention, showing an arm in flexion.

FIG. 2G is a diagram representing the primary embodiment of the present invention, showing an arm in extension.

FIG. 3C shows tensile members connecting from above the shoulder to the upper and lower arm, with these tensile members increasing the strength of the arm in movements at the elbow and shoulder and compensating for the weight of an object carried by the arm.

DETAILED DESCRIPTION OF THE PREFERRED EMBODIMENTS

Figure 1B:
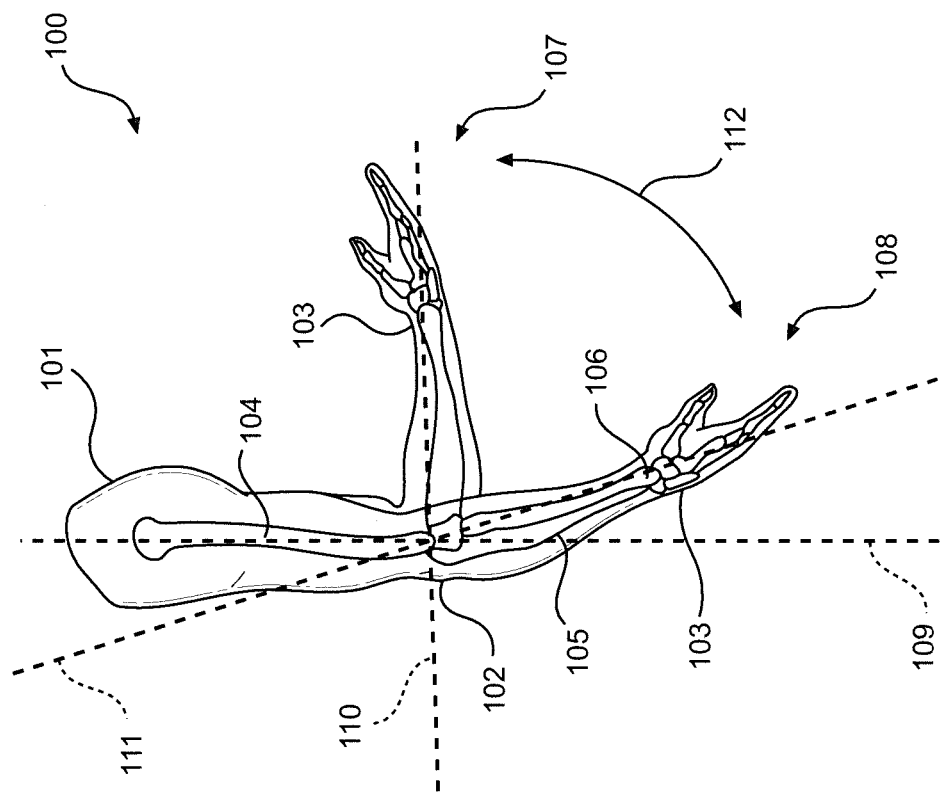
FIG. 1B shows the conventional flexion and extension movements of the human elbow.
Figure 1A:
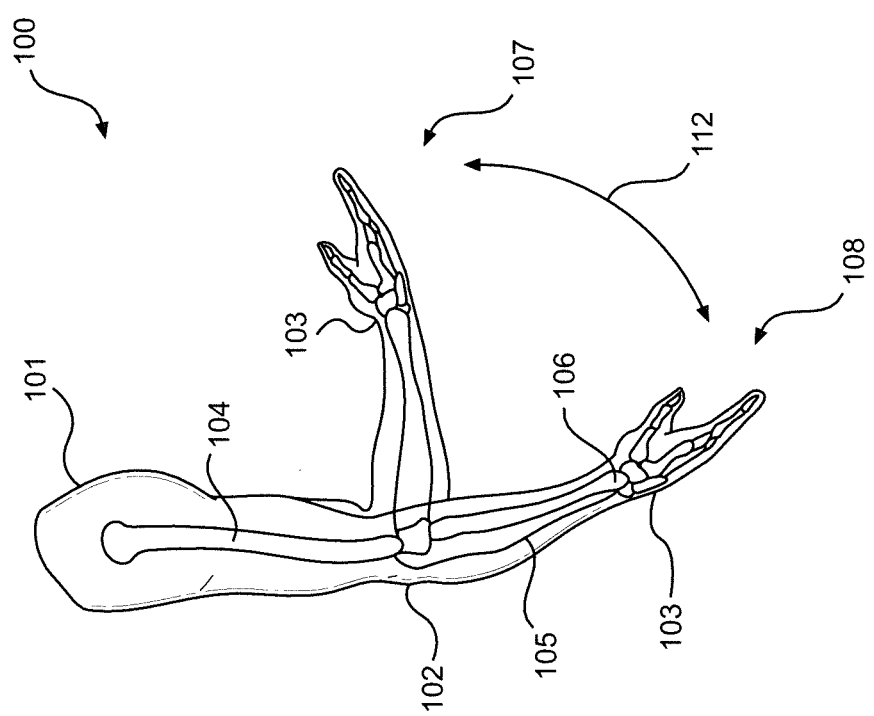
FIG. 1A shows the conventional flexion and extension movements of the human elbow.

Detailed embodiments of the present invention are disclosed herein. However, it is to be understood that the disclosed embodiments are merely exemplary of the invention that may be embodied in various and alternative forms. The figures are not necessarily to scale, and some features may be exaggerated or minimized to show details of particular components. Therefore, specific structural and functional details disclosed herein are not to be interpreted as limiting, but merely as a representative basis for teaching one skilled in the art to employ the present invention.

For illustration purposes, FIGS. 1A-G show the conventional movements of the human arm at the elbow. Regarding FIG. 1A, an arm 100 is shown, with arm 100 having a shoulder 101, an elbow 102, and a wrist 103. Shoulder 101 is connected at a fixed distance to elbow 102 by a humerus 104, and elbow 102 is connected at a fixed distance to wrist 103 by an ulna 105 and a radius 106. Arm 100 can pivot at elbow 102 over a range of motion 112 to an extended position 108 and a flexed position 107.

Regarding FIG. 1B, a line 109 is shown passing thorough shoulder 101 and elbow 102. In addition, a line 111 passes through elbow 102 and wrist 103 when wrist 103 is in extended position 108, and a line 110 passes through elbow 102 and wrist 103 when wrist 103 is in flexed position 107.

Figure 1C:
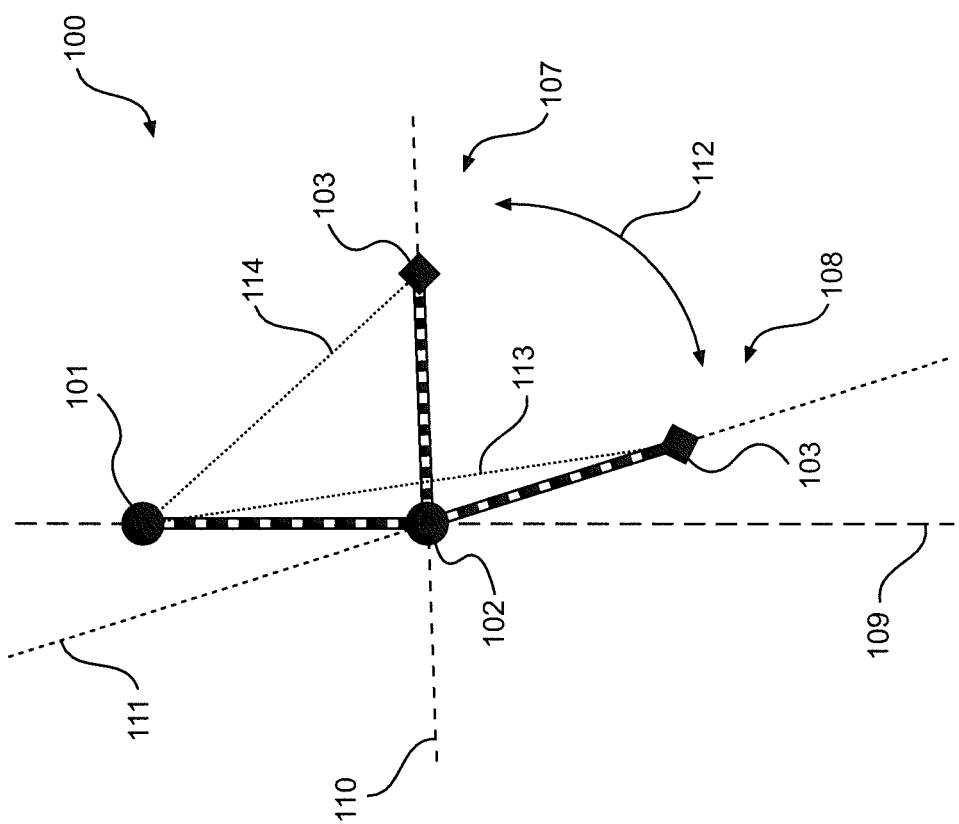
FIG. 1C is a diagram representing the conventional flexion and extension movements of the human elbow.

In FIG. 1C, a distance 113 is shown between shoulder 101 and wrist 103 when wrist 103 is in extended position 108, and a distance 114 is shown between shoulder 101 and wrist 103 when wrist 103 is in flexed position 107. Distance 113 is greater than distance 114.

Figure 1D:
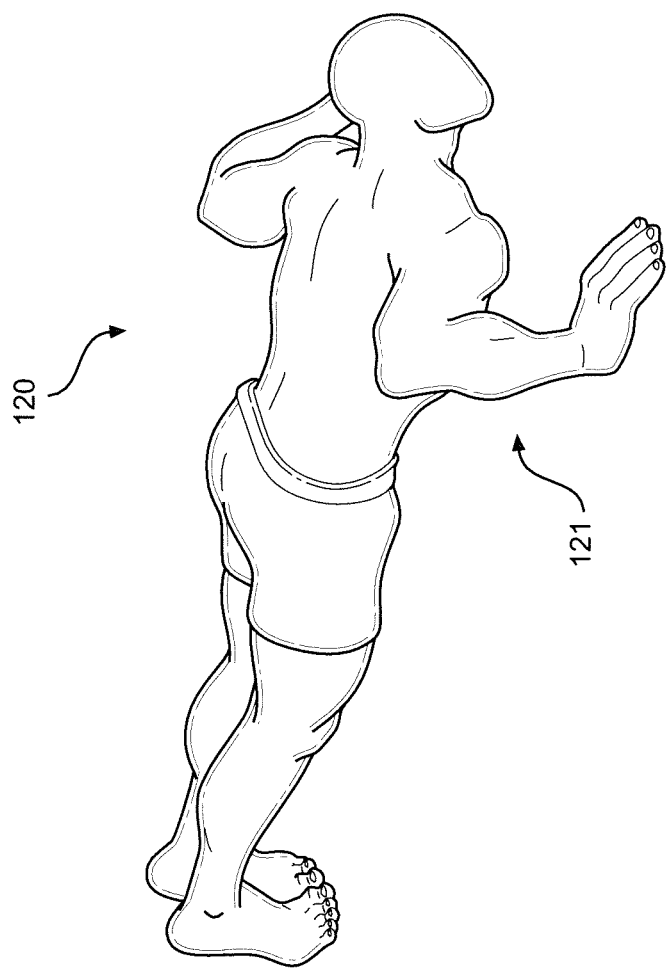
FIG. 1D shows a person doing a conventional push-up with arms in flexion.
Figure 1E:
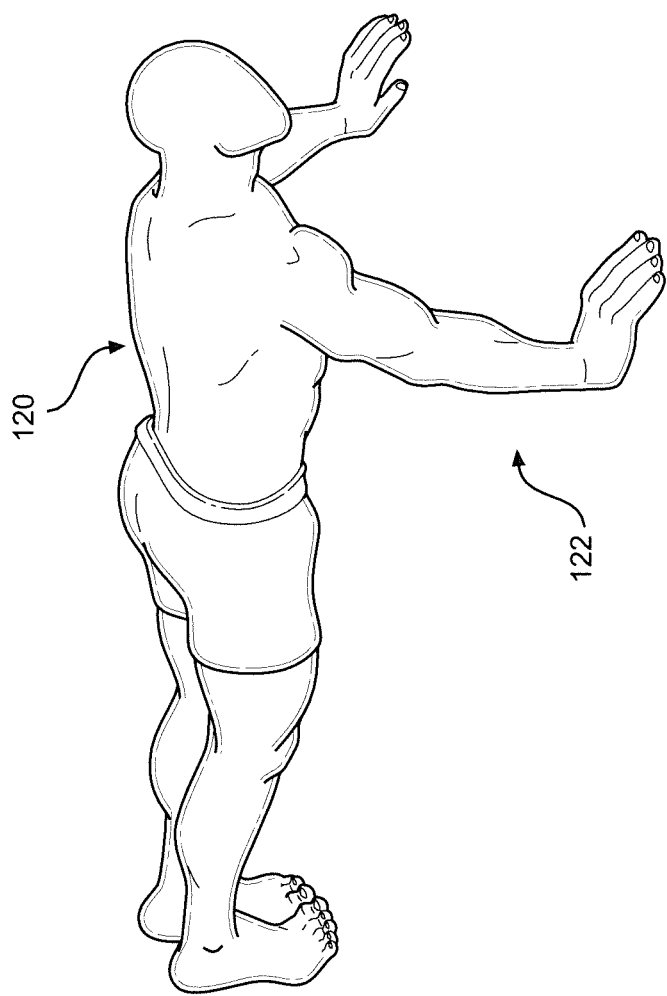
FIG. 1E shows a person doing a conventional push-up with arms in extension.

FIGS. 1D and 1E show a person 120 performing a conventional push-up movement, with the elbows of person 120 flexed in a down position 121 in FIG. 1D and extended in an up position 122 in FIG. 1E. FIGS. 1D and 1E show how the force generated by the extension of the elbow assists, in tandem with shoulder movements, in the elevation gain in opposition to the force of gravity seen in a push-up movement.

Figure 1G:
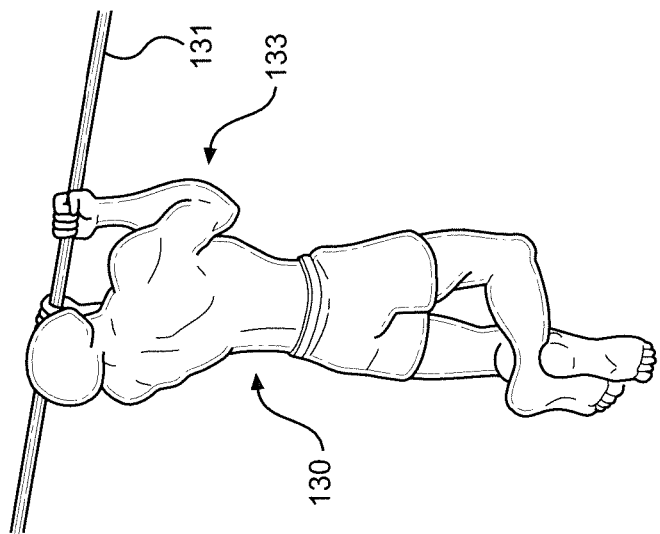
FIG. 1G shows a person doing a conventional pull-up with arms in flexion.
Figure 1F:
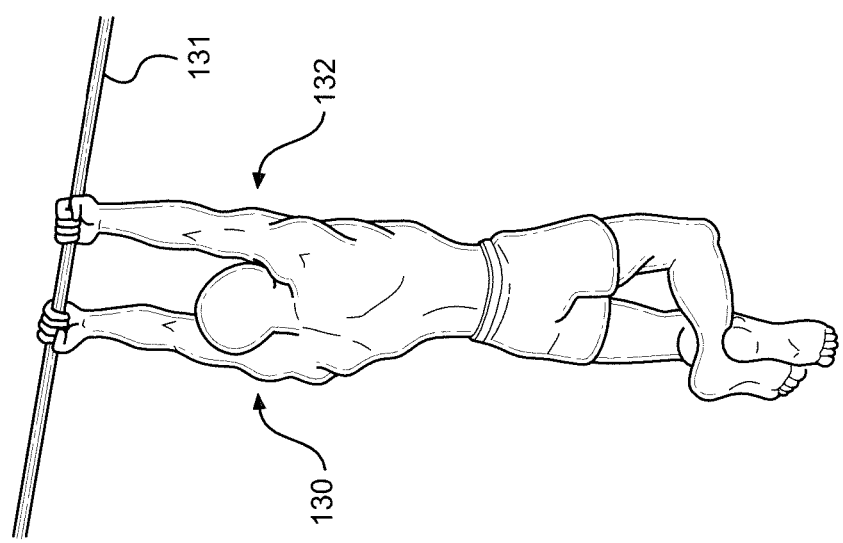
FIG. 1F shows a person doing a conventional pull-up with arms in extension.

FIGS. 1F and 1G show a person 130 performing a conventional pull-up movement while holding a bar 131, with the elbows of person 130 extended in a down position 132 in FIG. 1F and flexed in an up position 133 in FIG. 1G. FIGS. 1F and 1G show how the force generated by the flexion of the elbow assists, in tandem with shoulder movements, in the elevation gain in opposition to the force of gravity seen in a pull-up movement. More complicated series of movements can result from the sequential utilization of both elbow flexion and extension, such as the movements of the arms of a person climbing out of a swimming pool, with the initial lift from the water involving elbow flexion, and the second lift out of the water involving elbow extension.

Figure 2B:
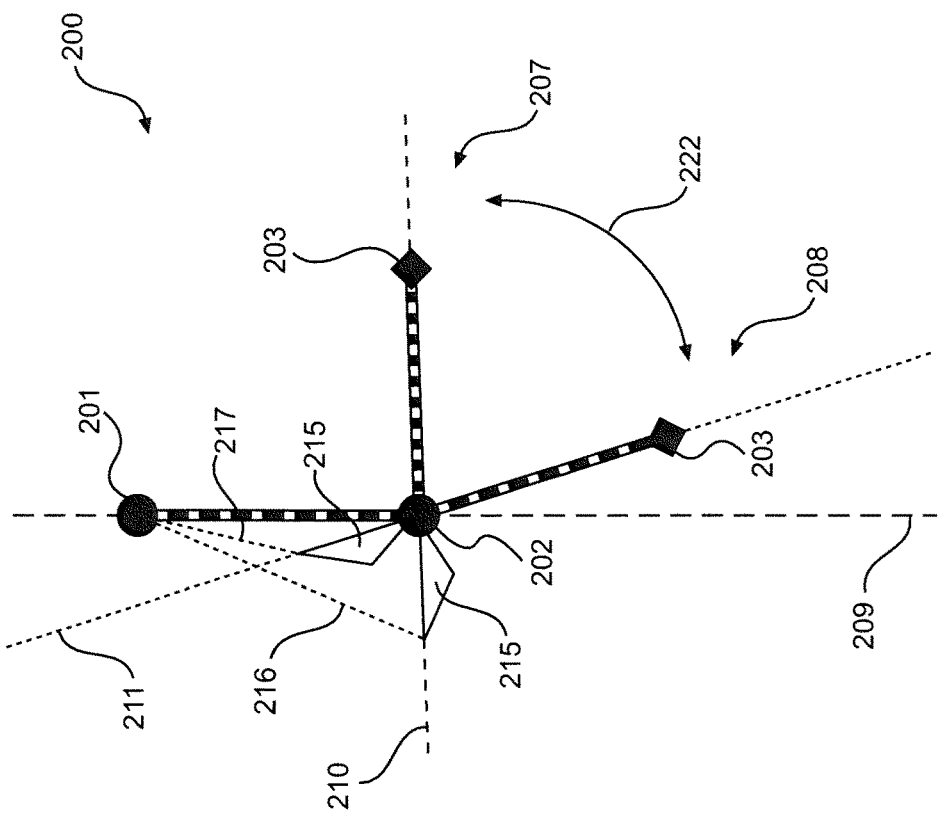
FIG. 2B is a diagram representing the flexion and extension movements of the human elbow.
Figure 2A:
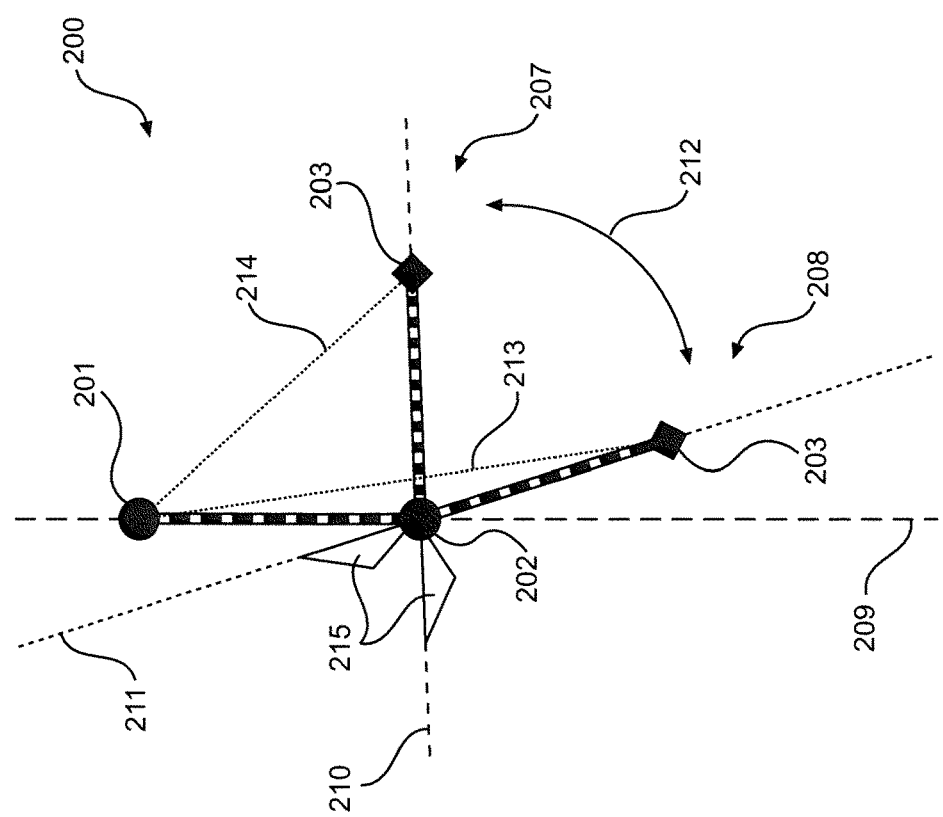
FIG. 2A is a diagram representing the flexion and extension movements of the human elbow.

The primary embodiment of the present invention is represented in FIGS. 2A-G. FIGS. 2A-C diagrammatically show how the device of the primary embodiment effects flexion of an arm about an elbow through changing the length of a tensile member affixed to a point on a forearm-coupled device. Regarding FIG. 2A, an arm 200 is shown, with arm 200 having a shoulder 201, an elbow 202, and a wrist 203. Shoulder 201 is connected at a fixed distance to elbow 202 by a humerus (e.g., humerus 104), and elbow 202 is connected at a fixed distance to wrist 203 by an ulna and a radius (e.g., ulna 105 and radius 106). Human arm bones are not shown in FIG. 2A, though they act as compression members to fix the length of upper and lower arms. Arm 200 can pivot at elbow 202 over a range of motion 212 to an extended position 208 and a flexed position 207. A line 209 is shown passing through shoulder 201 and elbow 202. In addition, a line 211 passes through elbow 202 and wrist 203 when arm 200 is in extended position 208, and a line 210 passes through elbow 202 and wrist 203 when arm 200 is in flexed position 207. An elbow spur 215 extends beyond elbow 202 along the line through wrist 203 and elbow 202, with elbow spur 215 being along line 211 when arm 200 is in extended position 208, and elbow spur 215 being along line 210 when arm 200 is in flexed position 207. A distance 213 between shoulder 201 and wrist 203 when arm 200 is in extended position 208 is greater than a distance 214 between shoulder 201 and wrist 203 when arm 200 is in flexed position 207.

In FIG. 2B, a distance 216 is shown between elbow spur 215 and shoulder 201 when arm 200 is in flexed position 207, and a distance 217 is shown between elbow spur 215 and shoulder 201 when arm 200 is in extended position 208. Distance 216 is greater than distance 217. Thus, if distance 216 were changed to distance 217, arm 200 would extend 222 about elbow 202, moving arm 200 from flexed position 207 to extended position 208.

FIG. 2C shows a fixed point 218 that is connected to shoulder 201 by a fixed distance 219. A distance 220 is shown between elbow spur 215 and fixed point 218 when arm 200 is in flexed position 207, and a distance 221 is shown between elbow spur 215 and fixed point 218 when arm 200 is in extended position 208. Thus, if distance 220 were changed to distance 221, arm 200 would extend 222 about elbow 202, moving arm 200 from flexed position 207 to extended position 208.

Figure 2E:
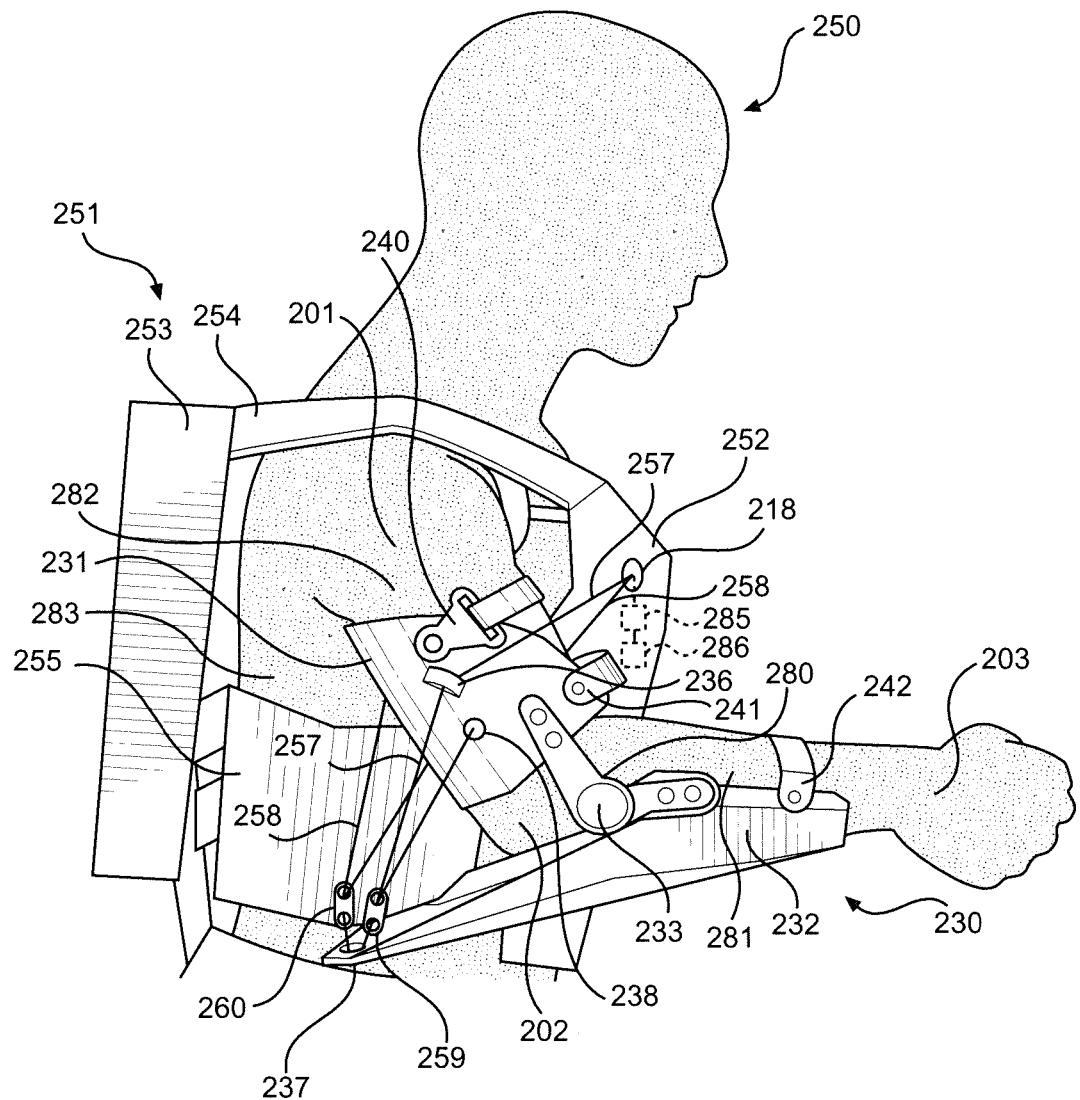
FIG. 2E shows a person wearing the device of the primary embodiment.

The device of a primary embodiment of the present invention is shown in FIGS. 2D and 2E. Regarding FIG. 2D, an elbow (or arm) brace 230 has an upper arm structure (or brace) 231 and a forearm structure (or brace) 232, with upper arm structure 231 and forearm structure 232 being rotatably connected by a hinge 233 at an elbow joint 280. Forearm structure 232 has an elbow spur 234 that extends beyond elbow joint 280 by a distance 235. A spur attachment point 237 is located at the distal end of spur 234 relative to joint 280. Forearm structure 232 has padding 243 and a forearm strap 242 to facilitate coupling of forearm structure 232 to the forearm of a person. Upper arm structure 231 has an upper arm strap 241, a strap attachment point 240, and upper arm padding (not visible) to facilitate coupling of upper arm structure 231 to the upper arm of a person. Upper arm structure 231 also has an outer tensile member attachment point 238 and an outer tensile member guide 236. The corresponding inner tensile member attachment point and inner tensile member guide are not visible in FIG. 2D.

Regarding FIG. 2E, a person 250 is shown wearing an upper body exoskeleton 251. Upper body exoskeleton 251 has a chest structure 252, a back structure 253, a shoulder structure 254, a flank structure 255, and elbow brace 230. Chest structure 252 and back structure 253 are connected by shoulder structure 254 and flank structure 255. Chest structure 252, back structure 253, shoulder structure 254, and flank structure 255 define a torso brace, which is coupled to a torso 283 of person 250. Forearm structure 232 of elbow brace 230 is coupled to a forearm 281 of person 250, and upper arm structure 231 of elbow brace 230 is coupled to an upper arm 282 of person 250. An outer tensile member 257 is affixed to outer tensile member attachment point 238 on upper arm structure 231 and routed through an outer pulley 259, with outer pulley 259 being rotatably connected to spur attachment point 237. After passing through outer pulley 259, tensile member 257 passes through outer tensile member guide 236 and enters fixed point 218, which takes the form of a guide hole in chest structure 252. Tensile member 257 is then connected to an actuator 285 (e.g., a winch or a spring). Actuator 285 is an internal component of chest structure 252 and can be driven by a power source 286, such as an electric motor. Similarly, an inner tensile member 258 is affixed to the inner tensile member attachment point on upper arm structure 231 (not visible) and routed through an inner pulley 260, with inner pulley 260 being rotatably connected to spur attachment point 237. After passing through inner pulley 260, tensile member 258 passes through the inner tensile member guide (not visible) and enters fixed point 218. Tensile member 258 is then connected to actuator 285. Actuator 285 is configured to exert a pulling force on tensile members 257 and 258. This pulling force reduces the length of each tensile member 257, 258 between elbow brace 230 and actuator 285, thereby causing arm 200 of person 250 to bend at elbow 202.

In some embodiments, actuator 285 is placed elsewhere on the exoskeleton structure, and tensile members 257 and 258 are routed to actuator 285 by tensile member guides. In some embodiments, a compression sleeve or other friction generating device is worn by person 250 to increase the tightness of the fit of elbow brace 230 and prevent slippage of elbow brace 230 during movement. In some embodiments, tensile members 257 and 258 are attached to and routed through elbow brace 230 differently, including internal routing or biomimetic routing. In some embodiments, a single actuator is used for both tensile members 257, 258. In some embodiments, each tensile member 257, 258 has a separate actuator, with these actuators being either collocated or separately located. In some embodiments, gearing, clutches, or block-and-tackle devices are applied to the tensile member and actuator system. In some embodiments, power source 286 is an electric motor. In other embodiments, power source 286 is any of a host of other power sources known in the art. In some embodiments, the portion of tensile member 257, 258 connected to elbow brace 230 can be selectively and quickly separated from the portion of tensile member 257, 258 connected to actuator 285 through use of a quicklink, split ring, carabiner, barrel bolt, or other coupling device or fastener known in the art.

Regarding FIGS. 2F and 2G, the movements of the device of the primary embodiment are diagrammatically represented during the execution of a push-up type movement, with arm 200 being in contact with a surface 269. As the distance between elbow spur 215 and fixed point 218 is decreased from distance 220 to distance 221, effected by the shortening of a tensile member through use of the device of the primary embodiment, arm 200 is extended about elbow 202, and the distance between surface 269 and shoulder 201 is increased from a distance 270 to a distance 271.

As an example of the primary embodiment of the present invention, consider a soldier in a combat situation who is wearing heavy body armor and a fully loaded backpack. If this soldier were to take fire in the field, dropping to a prone position would reduce the chance of this soldier being struck by projectiles. However, rising quickly from this prone position with the weight of the armor and backpack would be challenging, expending the soldier's energy and resulting in a slower rise to a standing position than would be possible without the weight of the armor and pack. Impeded mobility and additional energy consumption would both place the soldier at additional risk of injury, including that of being struck by enemy fire. Through use of the device of the primary embodiment of the present invention, the soldier can use a powered winch on an exoskeleton to impart increased strength to his or her arms, allowing for a faster return to a standing (or running) position from a prone position, thereby improving endurance and survivability for this soldier.

Figure 3B:
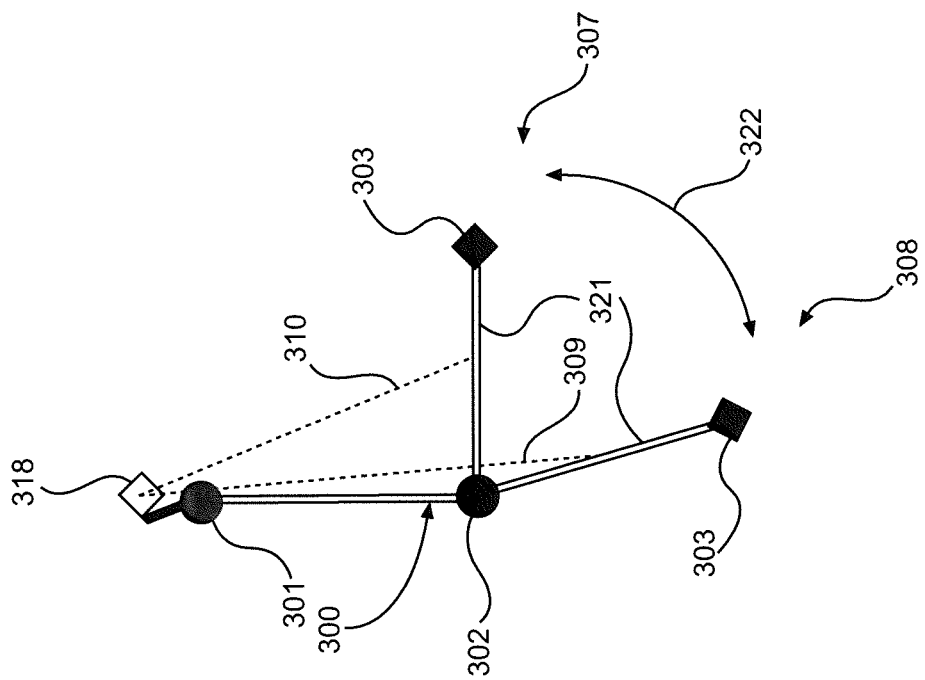
FIG. 3B is a diagram representing the flexion and extension movements of the human elbow, showing tensile members supporting the arm and the movement of the elbow.
Figure 3A:
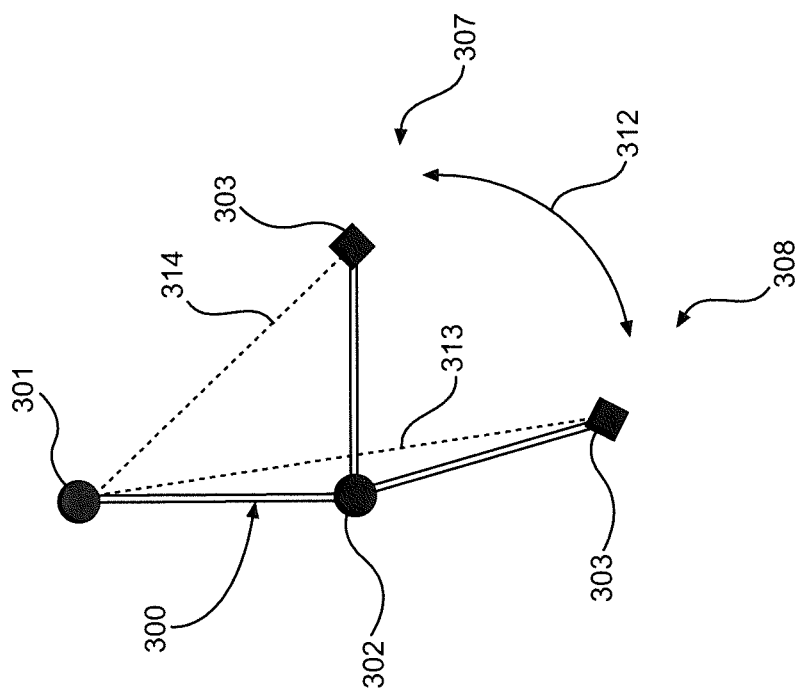
FIG. 3A is a diagram representing the flexion and extension movements of the human elbow.
Figure 3C:
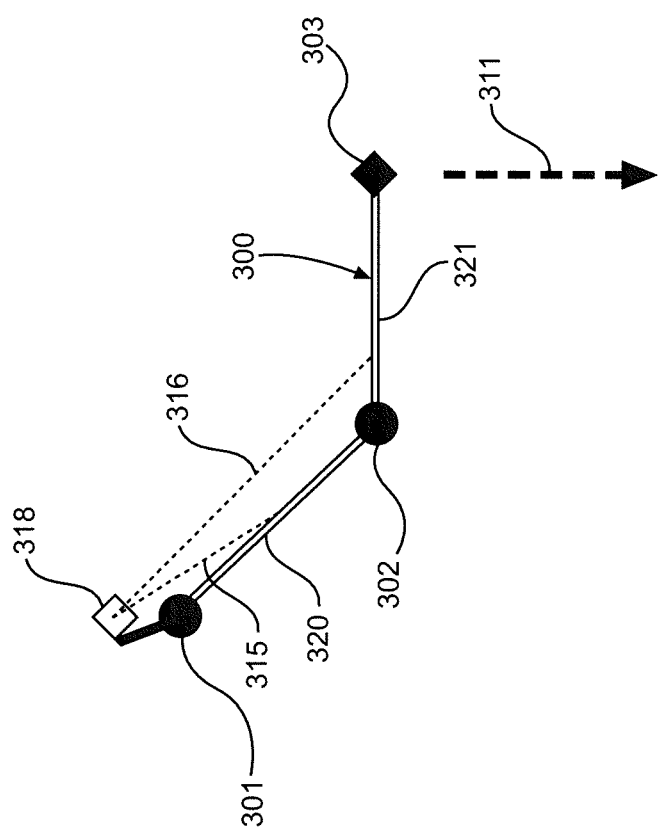
FIG. 3C is a diagram representing the second embodiment of the present invention.
Figure 3D:
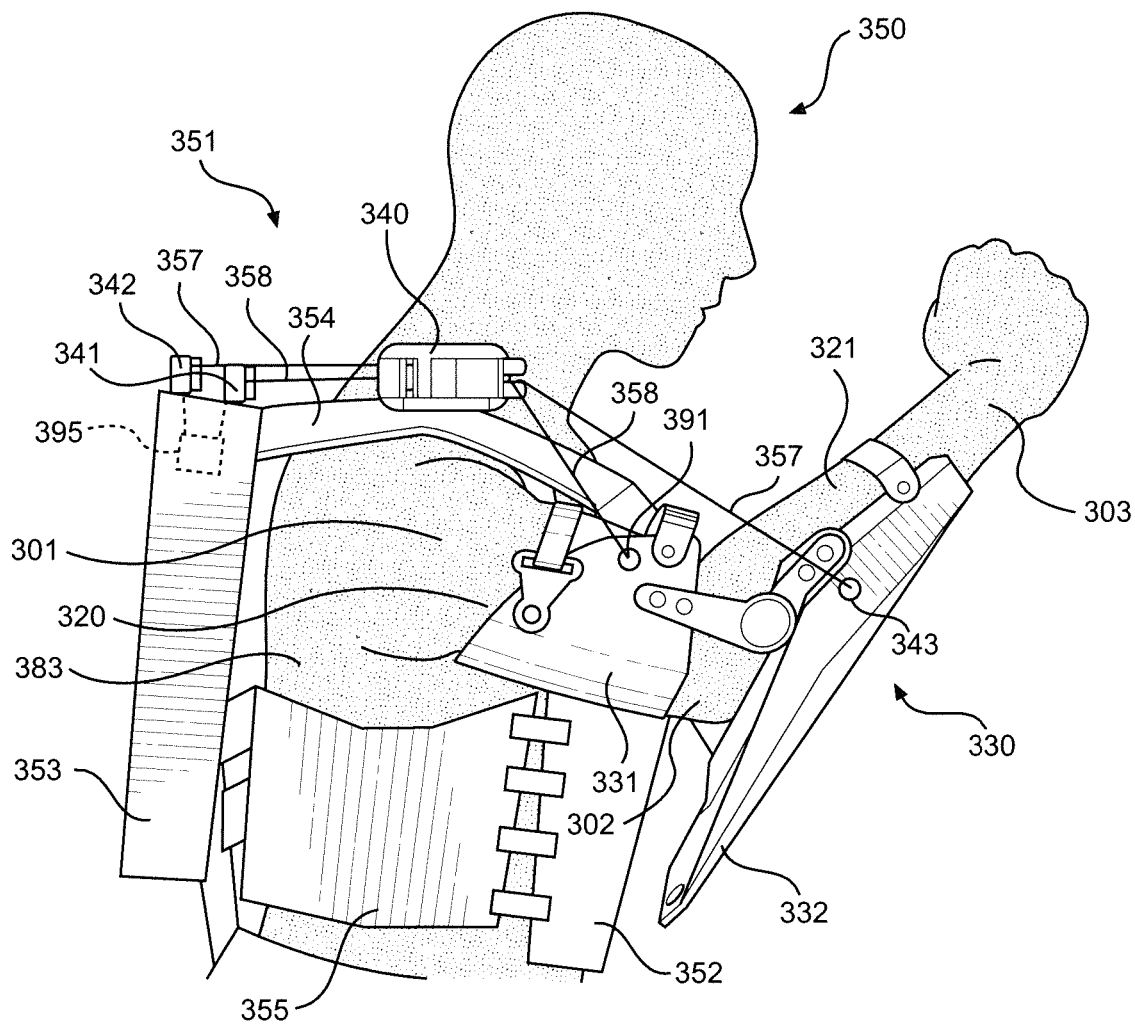
FIG. 3D shows a person wearing the device of the second embodiment.
Figure 3E:
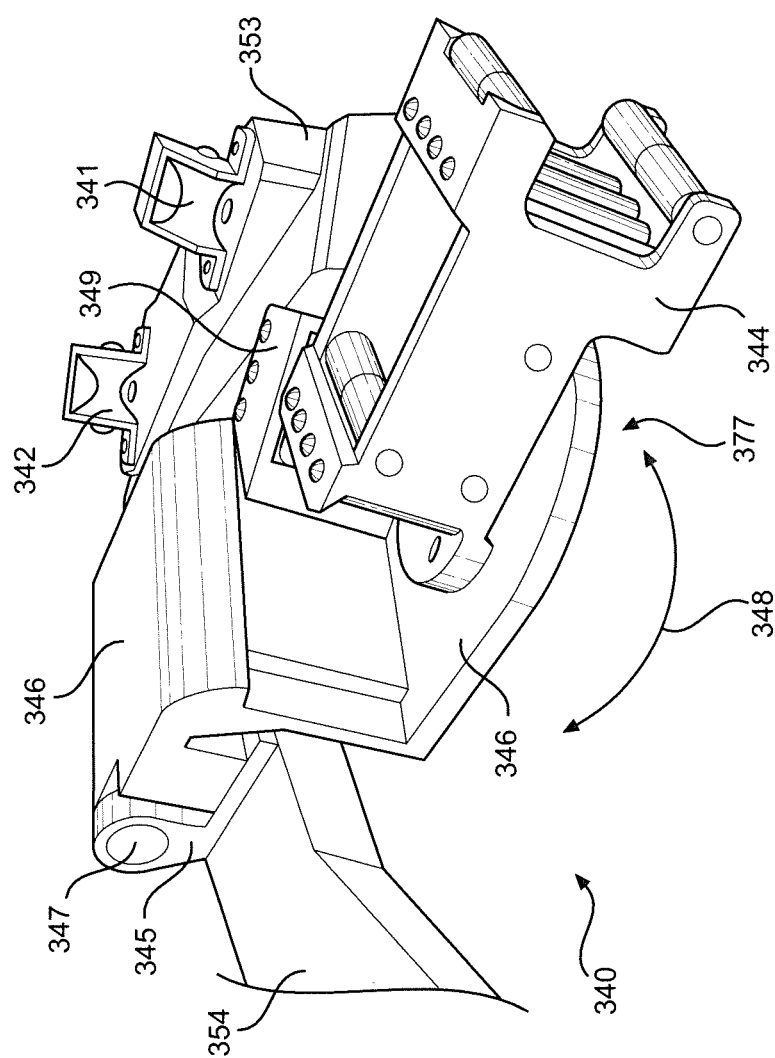
FIG. 3E is a detailed profile view of the shoulder- and back-mounted components of the device of the second embodiment.

The second embodiment of the present invention is represented in FIGS. 3A-J. FIGS. 3A-C diagrammatically show how the device of the second embodiment supports an arm and effects flexion of the arm about the elbow by applying force to tensile members extending from above the shoulder to forearm and upper arm portions of the arm structure. Regarding FIG. 3A, an arm 300 is shown, with arm 300 having a shoulder 301, an elbow 302, and a wrist 303. Shoulder 301 is connected at a fixed distance to elbow 302 by a humerus (e.g., humerus 104), and elbow 302 is connected at a fixed distance to wrist 303 by an ulna and a radius (e.g., ulna 105 and radius 106). Human arm bones are not shown in FIG. 3A, though they act as compression members to fix the length of upper and lower arms. Arm 300 can pivot at elbow 302 over a range of motion 312 to an extended position 308 and a flexed position 307. A distance 313 between shoulder 301 and wrist 303 when wrist 303 is in extended position 308 is greater than a distance 314 between shoulder 301 and wrist 303 when wrist 303 is in flexed position 307. Thus, if distance 313 were changed to distance 314, arm 300 would flex about elbow 302, moving wrist 303 from extended position 308 to flexed position 307.

In FIG. 3B, a distance 310 is shown between a fixed point 318 and a forearm 321 when arm 300 is in flexed position 307, and a distance 309 is shown between fixed point 318 and forearm 321 when arm 300 is in extended position 308. Thus, if distance 309 were changed to distance 310, arm 300 would flex 322 about elbow 302, moving arm 300 from extended position 308 to flexed position 307.

In FIG. 3C, a distance 315 is shown between fixed point 318 and an upper arm 320, and a distance 316 is shown between fixed point 318 and forearm 321. If distance 315 and distance 316 were fixed, a downward force 311 applied to arm 300 (e.g., from the weight of a carried object) would be counteracted, and neither the position of arm 300 nor the extension/flexion of elbow 302 would be changed. Further, if pulling forces were applied along distances 315 and 316, force 311 could be compensated for, allowing arm 300 to move more freely about elbow 302 and shoulder 301 than if force 311 were not counteracted.

The device of the second embodiment of the present invention is shown in FIGS. 3D-J. The device of the second embodiment can include elbow brace 230 of the primary embodiment, shown in FIGS. 2D and 2E, or another similar device. Regarding FIG. 3D, a person 350 is shown wearing an upper body exoskeleton 351. Upper body exoskeleton 351 has a chest structure 352, a back structure 353, a shoulder structure 354, a flank structure 355, and an elbow (or arm) brace 330. Chest structure 352 and back structure 353 are connected by shoulder structure 354 and flank structure 355. Chest structure 352, back structure 353, shoulder structure 354, and flank structure 355 define a torso brace, which is coupled to a torso 383 of person 350. A forearm structure (or brace) 332 of elbow brace 330 is coupled to a forearm 321 of person 350, and an upper arm structure (or brace) 331 of elbow brace 330 is coupled to an upper arm 320 of person 350. A tensile member 358 is affixed to a tensile member attachment point 391 on upper arm structure 331 and routed through a shoulder tensile guide assembly 340, over a pulley 341, and into the interior of back structure 353. Tensile member 358 is then connected to an actuator 395 (e.g., a winch or a spring). Actuator 395 is an internal component of back structure 353 and can be driven by a power source, such as an electric motor. Alternatively, actuator 395 is unpowered (as shown). A tensile member 357 is affixed to a tensile member attachment point 343 on forearm structure 332 and routed through shoulder tensile guide assembly 340, over a pulley 342, and into the interior of back structure 353. Tensile member 357 is then connected to actuator 395. Actuator 395 is configured to exert a pulling force on tensile members 357 and 358. This pulling force reduces the length of each tensile member 357, 358 between elbow brace 330 and actuator 395, thereby causing arm 300 of person 350 to bend at elbow 302.

In some embodiments, actuator 395 is placed elsewhere on the exoskeleton structure, and tensile members 357 and 358 are routed to actuator 395 by tensile member guides. In some embodiments, a compression sleeve or other friction generating device is worn by person 350 to increase the tightness of the fit of elbow brace 330 and prevent slippage of elbow brace 330 during movement. In some embodiments, tensile members 357 and 358 are routed differently in forearm structure 332 and/or upper arm structure 331, including internal routing or biomimetic routing. In some embodiments, a single actuator is used for both tensile members 357, 358. In other embodiments, each tensile member 357, 358 has a separate actuator, with these actuators being either collocated or separately located. In some embodiments, gearing, clutches, or block-and-tackle devices are applied to the tensile member and actuator system. In some embodiments, actuator 395 is driven by an electric motor. In other embodiments, actuator 395 is driven by any of a host of other power sources known in the art, such as springs. In some embodiments, different levels of force are applied to each tensile member 357, 358. In some embodiments, this level of force is modulated by the exoskeleton control system or exoskeleton wearer. In some embodiments, tensile member attachment points 343 and 391 are not points but rather short rails along which tensile members 357 and 358 can slide, allowing for improved arm dexterity. In some embodiments, tensile members 357 and 358 can be selectively disconnected from tensile member attachment points 343 and 391, such as by use of push-disconnect sling swivel mounts or other devices known in the art.

FIGS. 3E-I show detailed views of shoulder tensile guide assembly 340. Shoulder tensile guide assembly 340 is an important element of the device of the second embodiment, as shoulder tensile guide assembly 340 allows for the wearer of the device of the second embodiment to have a high degree of arm flexibility and dexterity while still being able to make use of improved arm strength for flexion movements at the elbow. Regarding FIG. 3E, shoulder tensile guide assembly 340 is comprised of a shoulder mount 345, a hinge joint 347, a mounting structure 346, a rear tensile guide body 349, and a pivoting tensile guide body 344. Shoulder mount 345 is affixed to shoulder structure 354 and rotatably connected to mounting structure 346. Rear tensile guide body 349 is affixed to mounting structure 346, and pivoting tensile guide body 344 is rotatably connected to mounting structure 346 about joint 377, allowing pivoting tensile guide body 344 to rotate about a range of motion 348.

Figure 3G:
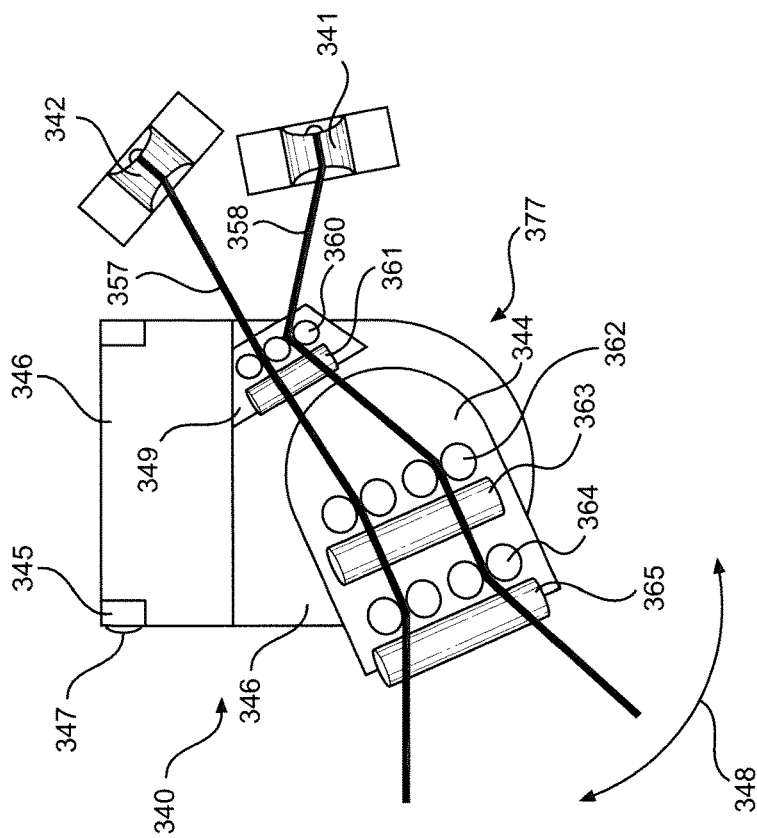
FIG. 3G is a simplified overhead cutaway view showing how the tensile members are guided through the shoulder- and back-mounted components of the device of the second embodiment, with the shoulder shown in a forward or internally rotated position relative to that shown in FIG. 3F.
Figure 3F:
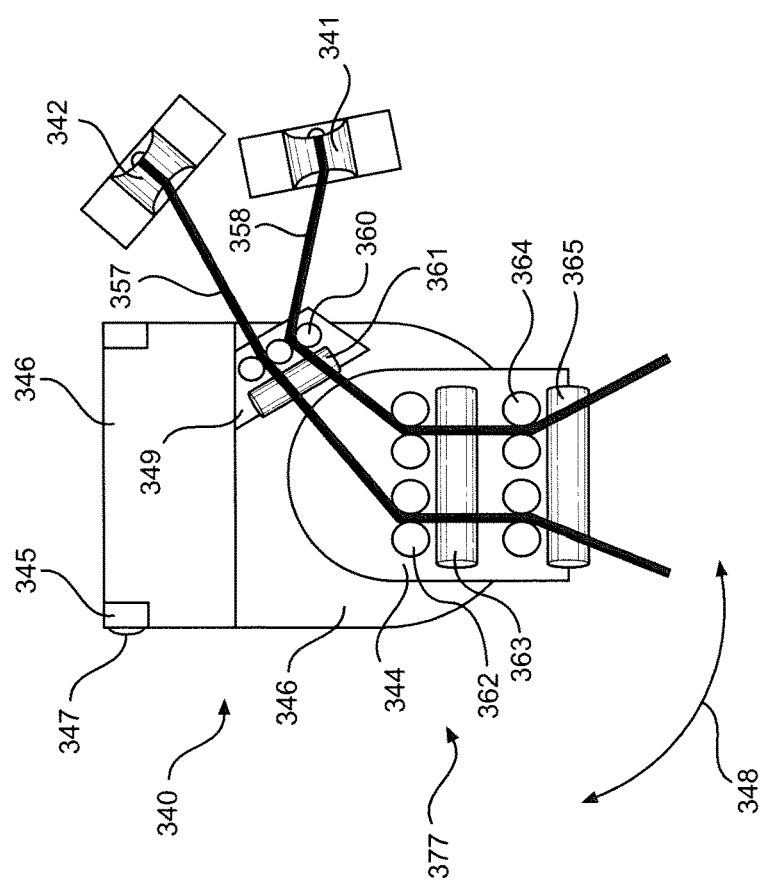
FIG. 3F is a simplified overhead cutaway view showing how the tensile members are guided through the shoulder- and back-mounted components of the device of the second embodiment.

Regarding FIGS. 3F and 3G, tensile members 357 and 358 are fed from pulleys 342 and 341, respectively, into rear tensile guide body 349, where each tensile member 357, 358 is guided (and separated from the other tensile member 357, 358) by vertical guides 360 and horizontal guides 361. Tensile members 357 and 358 then pass into pivoting tensile guide body 344, where each tensile member 357, 358 is guided (and separated from the other tensile member 357, 358) by vertical guides 362 and 364 and horizontal guides 363 and 365.

Figure 3H:
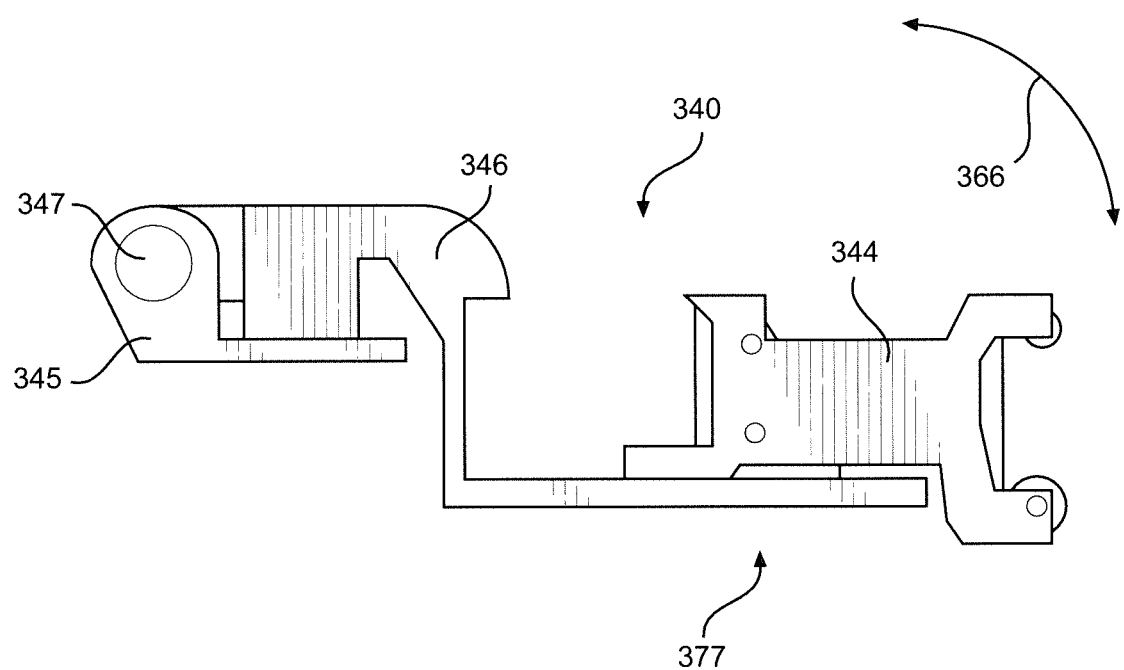
FIG. 3H is a simplified front view showing the shoulder-mounted device of the second embodiment, with the position of the shoulder hinge in full adduction.
Figure 3I:
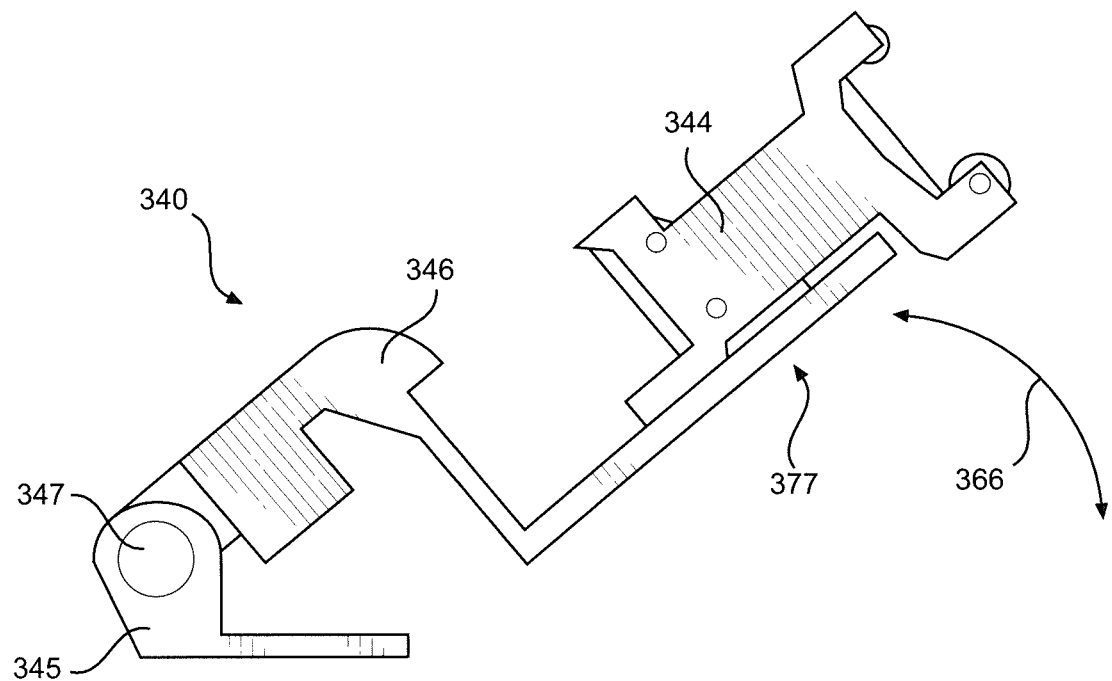
FIG. 3I is a simplified front view showing the shoulder-mounted device of the second embodiment, with the position of the shoulder hinge in abduction.

Regarding FIGS. 3H and 3I, the movements of shoulder tensile guide assembly 340 about hinge joint 347 are shown, with shoulder tensile guide assembly 340 traveling in the coronal plane, relative to the exoskeleton wearer, over a range of motion 366. In some embodiments, additional outer components are added to shoulder tensile guide assembly 340 to prevent material from becoming entangled in guides 360-365 or tensile members 357 and 358. In some embodiments, springs are used to keep shoulder tensile guide assembly 340 in a resting position when arm 300 is not being maneuvered, tensile members 357 and 358 are not engaged, or tensile members 357 and 358 are disconnected from arm 300.

Figure 3J:
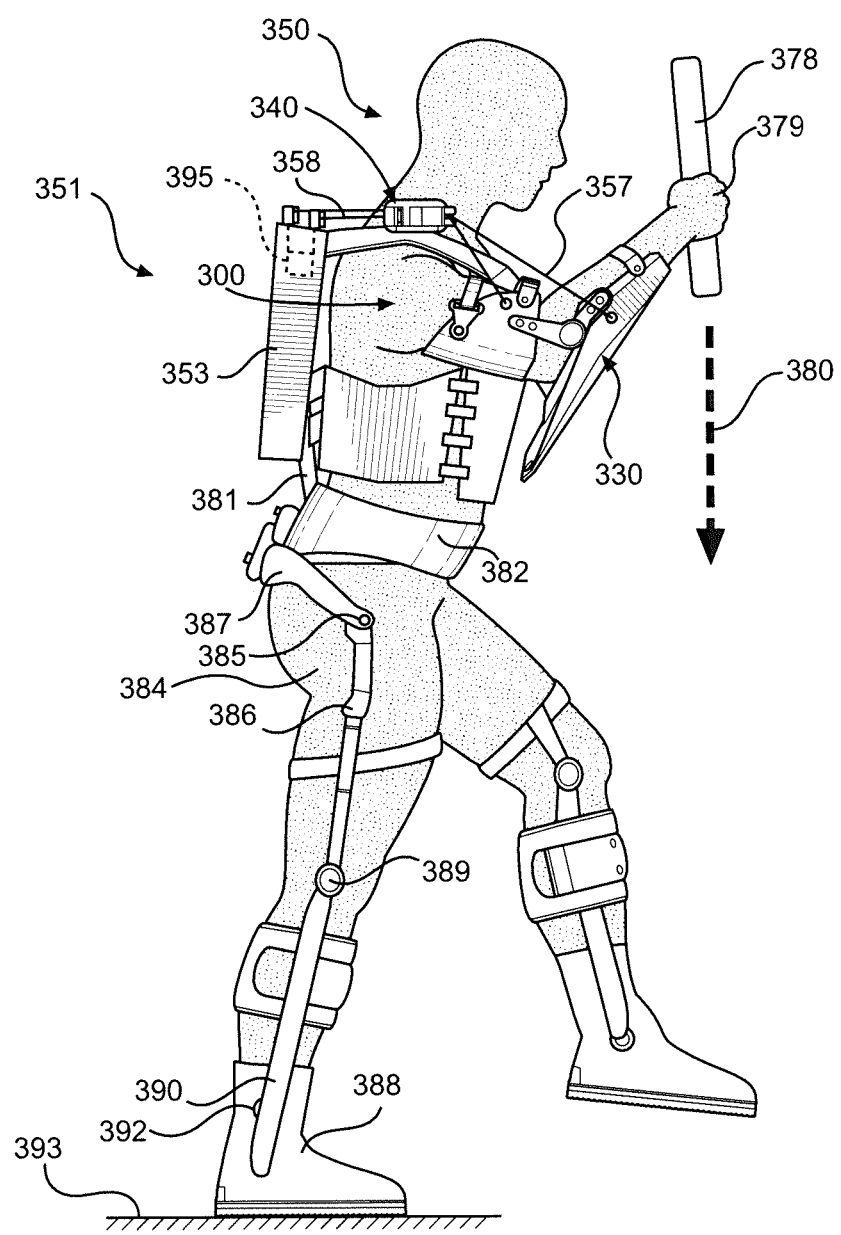
FIG. 3J is a side view of a person wearing an exoskeleton equipped with the device of the second embodiment, with this person walking while carrying a heavy object.

FIG. 3J shows person 350 wearing exoskeleton 351 while walking, with exoskeleton 351 being equipped with the device of the second embodiment. Person 350 is carrying an object 378 in a hand 379 of arm 300. A downward force 380 is exerted by the weight of object 378, with downward force 380 being counteracted by arm brace 330. Arm brace 330 is supported by tensile members 357 and 358, with tensile members 357 and 358 passing through shoulder tensile guide assembly 340 to back structure 353. Downward force 380 is thereby transmitted through arm brace 330, to tensile members 357 and 358, and to back structure 353. Back structure 353 is connected to an abdomen structure 382 by a back connector 381. A hip structure 387 is supported by abdomen structure 382 at a hip 384, with hip structure 387 being rotatably connected to an upper leg structure 386 at a hip joint 385. Upper leg structure 386 is rotatably connected to a lower leg structure 390 at a knee joint 389, and lower leg structure 390 is rotatably connected to a boot 388 at an ankle joint 392. Boot 388 is ultimately supported by a support surface 393. By this connectivity, some or all of downward force 380 is transferred around person 350, through the structure of exoskeleton 351, and into surface 393.

As an example of the second embodiment of the present invention, consider a person lifting a heavy object, such as an antitank weapon, and carrying it while walking over a distance. Through use of the device of the second embodiment, an exoskeleton can impart greater strength to this person's arms, allowing the person to hold additional weight in his or her arms or carry weight for a longer period of time with reduced arm fatigue.

The device of the third embodiment of the present invention is shown in FIGS. 4A-F. Regarding FIG. 4A, a glove 400 has an elastic structure 401, an inelastic palm structure 402, a wrist band 403, strapping 404, and glove connections 405 and 406. Regarding FIG. 4B, elastic structure 401 and strapping 404 allow for a tight fit of glove 400 to a hand of a person 450 (not visible). Person 450 is shown wearing an upper body exoskeleton 451, with exoskeleton 451 being equipped with the device of the third embodiment of the present invention. A forearm structure (or brace) 432 of an elbow (or arm) brace 430 is coupled to glove connections 405 and 406 of glove 400, allowing transmission of force from inelastic palm structure 402 to forearm structure 432.

Figure 4A:
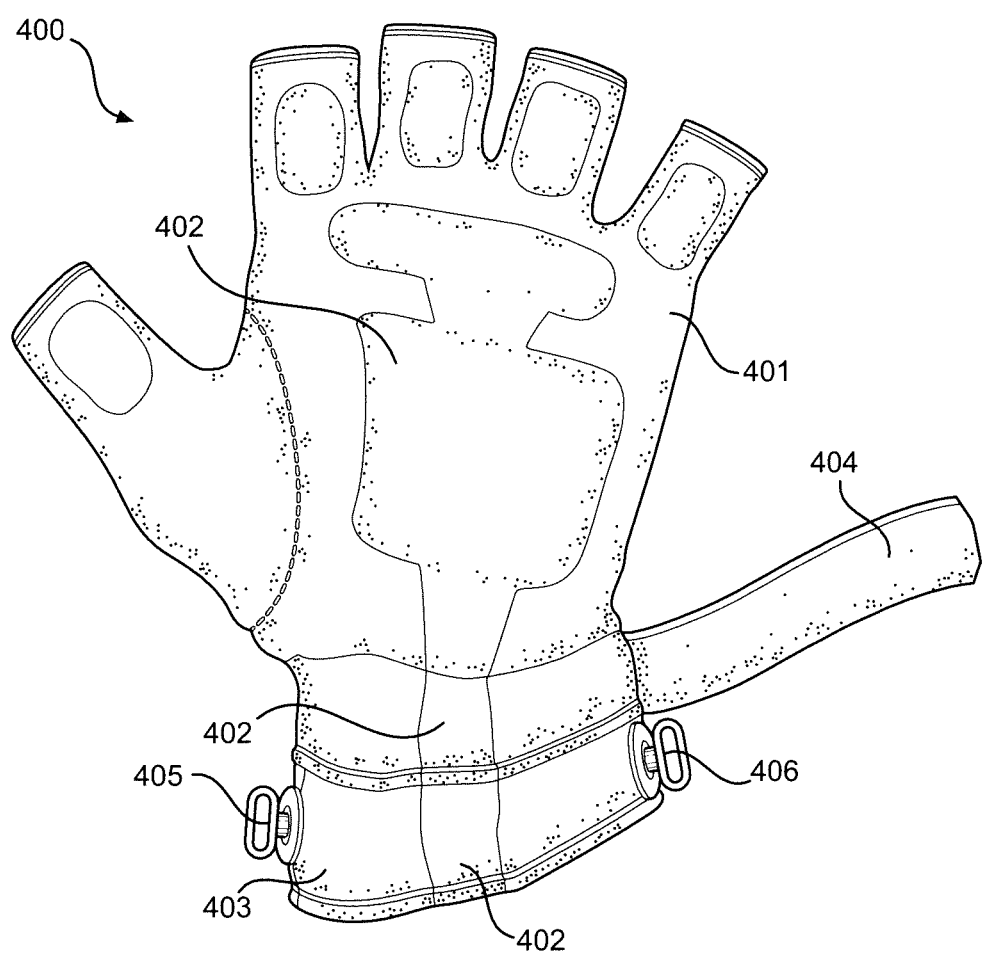
FIG. 4A shows a glove of the device of the third embodiment of the present invention.
Figure 4B:
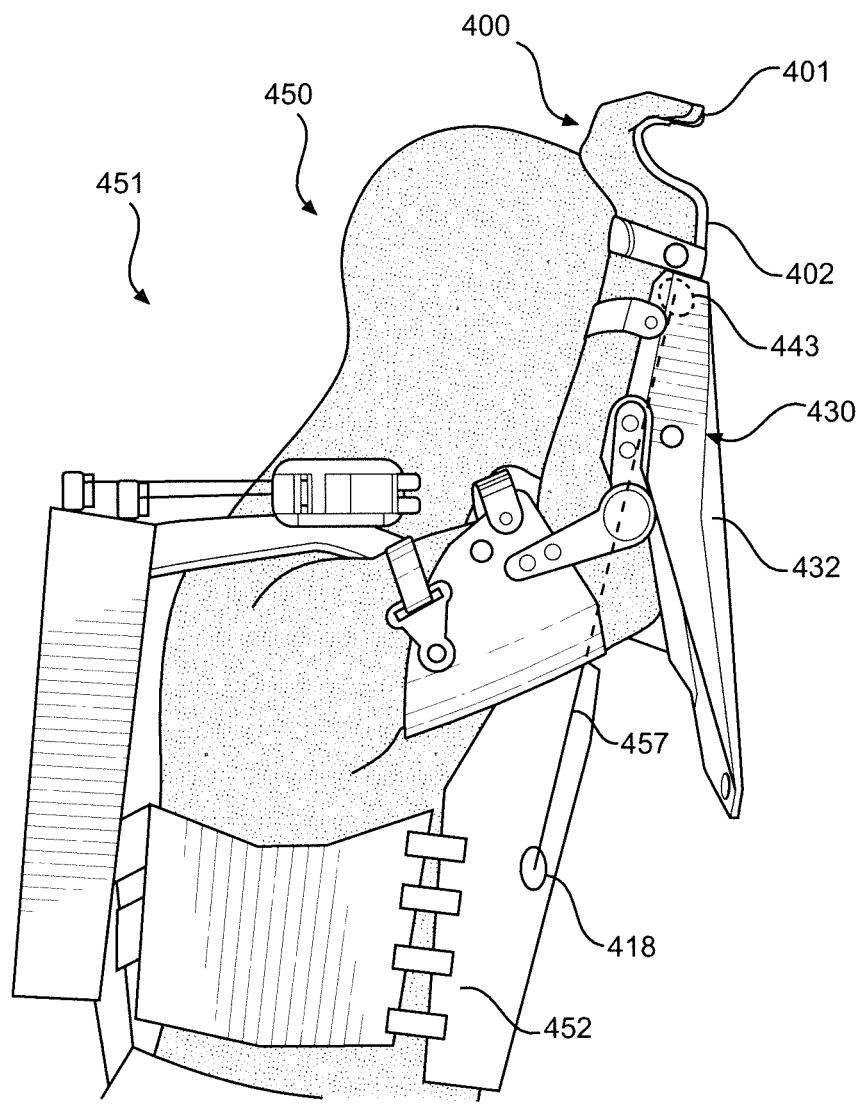
FIG. 4B shows a person wearing the device of the third embodiment.
Figure 4C:
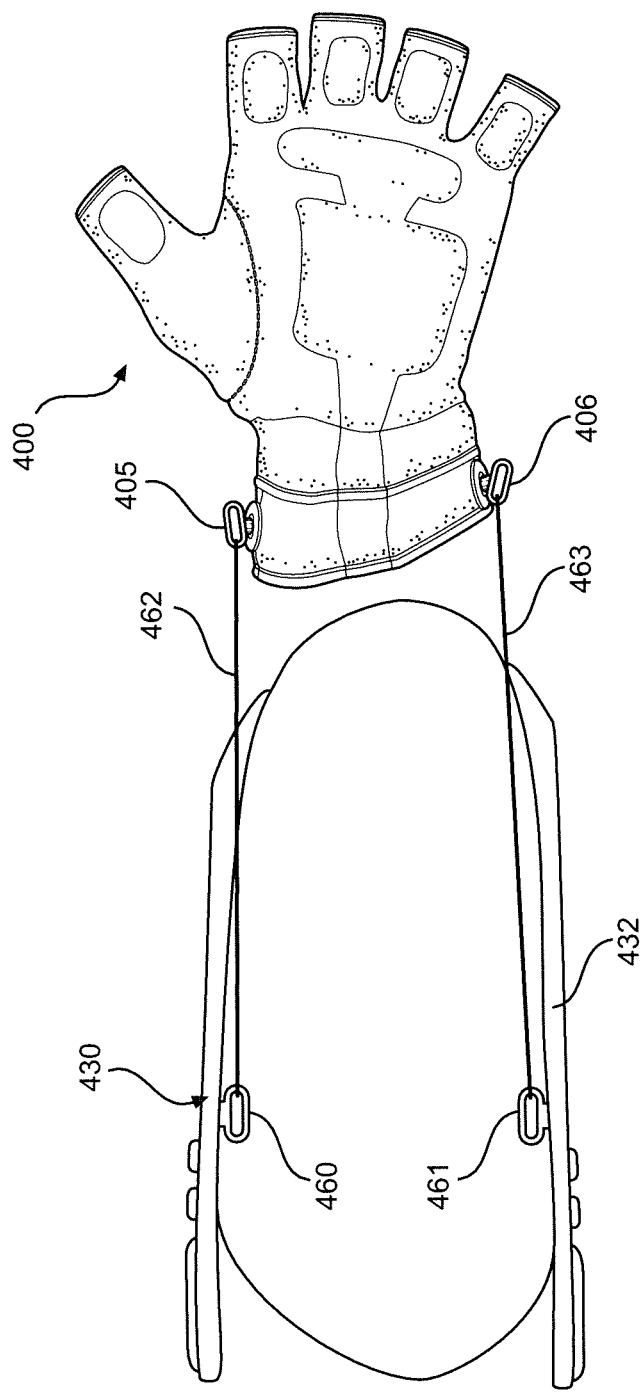
FIG. 4C shows the linkage of the glove to the forearm structure in the third embodiment.
Figure 4D:
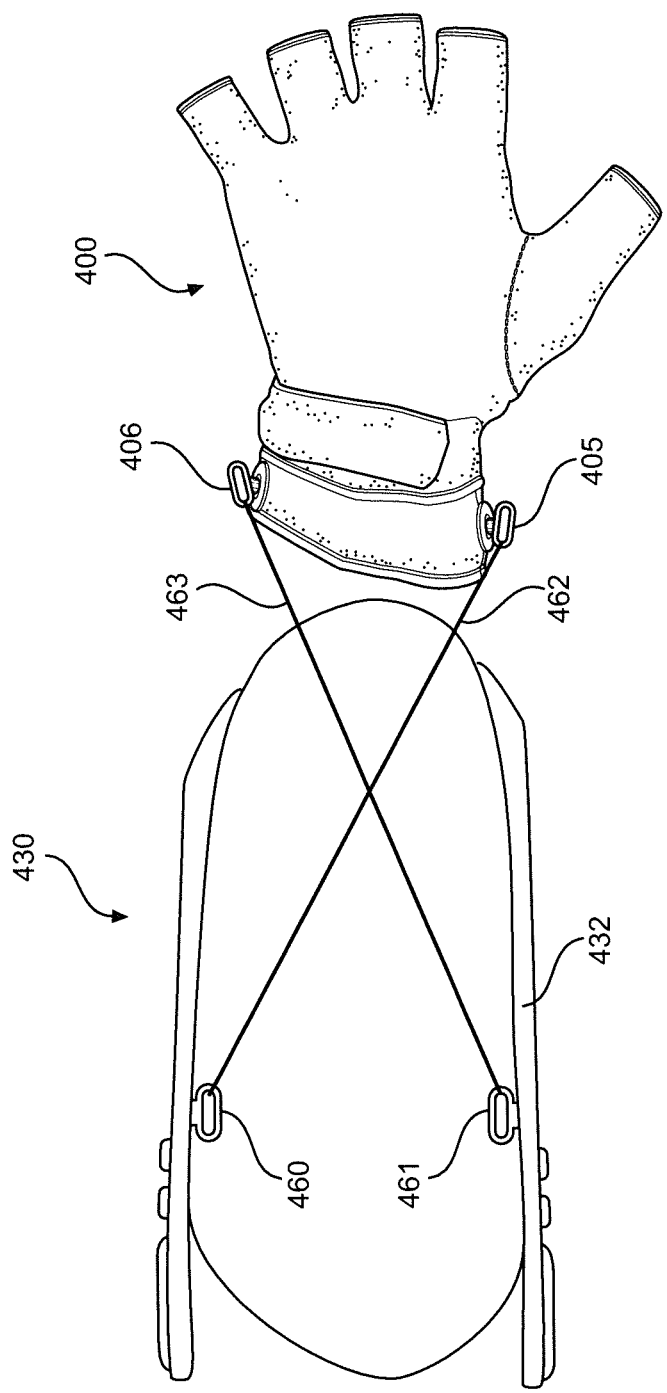
FIG. 4D shows the linkage of the glove to the forearm structure in the third embodiment, with the glove shown rotated relative to the forearm structure.

FIGS. 4C and 4D show how glove 400 is attached to forearm structure 432 in the third embodiment of the present invention so as to allow the wrist of person 450 to twist within forearm structure 432. Forearm structure 432 has forearm connections 460 and 461. Glove connection 405 is attached to forearm connection 460 by a strap 462, and glove connection 406 is attached to forearm connection 461 by a strap 463, allowing the transmission of force from forearm structure 432 to glove 400 and inelastic palm structure 402.

With reference again to FIG. 4B, due to the connectivity of inelastic palm structure 402 to forearm structure 432, force generated by a winch located within a chest structure 452 (not visible) is transmitted by a tensile member 457 from a fixed point 418 to a tensile member attachment point 443, around the hand of person 450, and into glove 400, granting person 450 greater lifting or climbing ability.

Figure 4F:
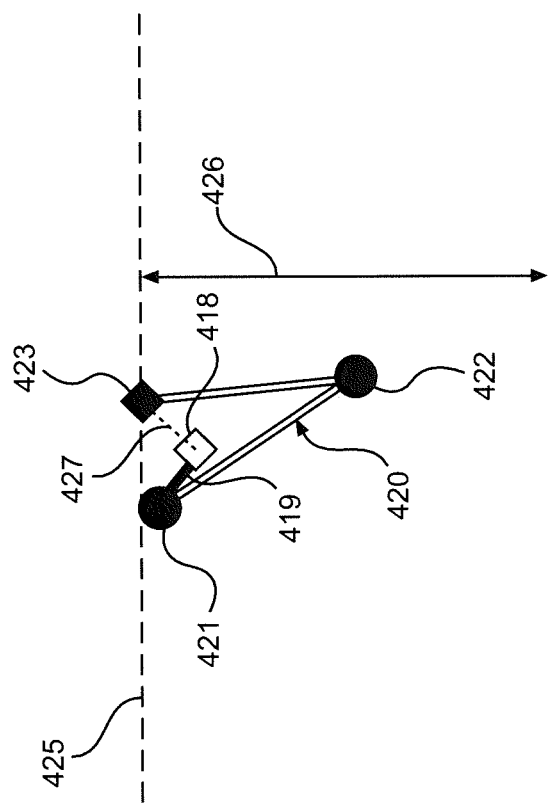
FIG. 4F is a diagram representing the third embodiment, showing an arm in flexion.
Figure 4E:
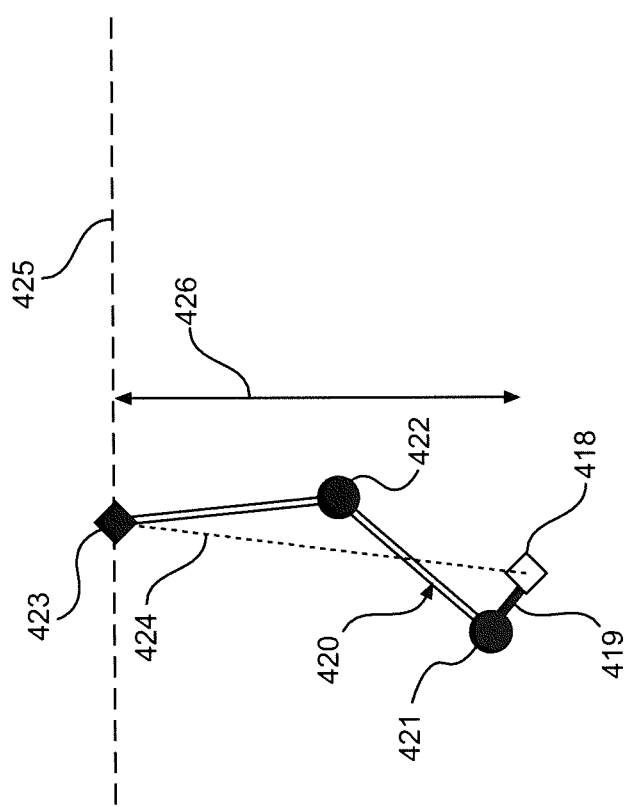
FIG. 4E is a diagram representing the third embodiment, showing an arm in extension.

FIGS. 4E and 4F diagrammatically represent the use of the third embodiment in a climbing or lifting motion. An arm 420 of person 450 includes a shoulder 421, an elbow 422, and a wrist 423. Wrist 423 is coupled to a ledge 425 by the hand of person 450 and glove 400 (not shown in FIGS. 4E and 4F). Fixed point 418 is attached to shoulder 421 at a fixed distance 419. FIG. 4E shows arm 420 in the extended position, with a distance 424 between wrist 423 and fixed point 418 and a distance 426 between shoulder 421 and ledge 425. FIG. 4F shows arm 420 in the flexed position, with the distance between wrist 423 and fixed point 418 being reduced to a distance 427, resulting in the lifting of shoulder 421 over a distance 426.

In some embodiments, glove 400 is fully fingered. In some embodiments, glove 400 has a high friction surface. In some embodiments, glove 400 is affixed to forearm structure 432, elbow brace 430, or tensile member 457 by other means known in the art.

As an example of the device of the third embodiment of the present invention, consider a soldier in combat who is attempting to climb over an 8-foot wall while wearing full body armor. If this soldier were equipped with the device of the third embodiment, he or she would be able to use power from the winch to assist in lifting themselves, and the weight of armor and equipment being carried, to ascend the wall. Without this assistance, the soldier might not be able to traverse the wall, possibly placing him or her at increased risk of taking enemy fire or slowing his or her movement along the best or fastest route.

Figure 5A:
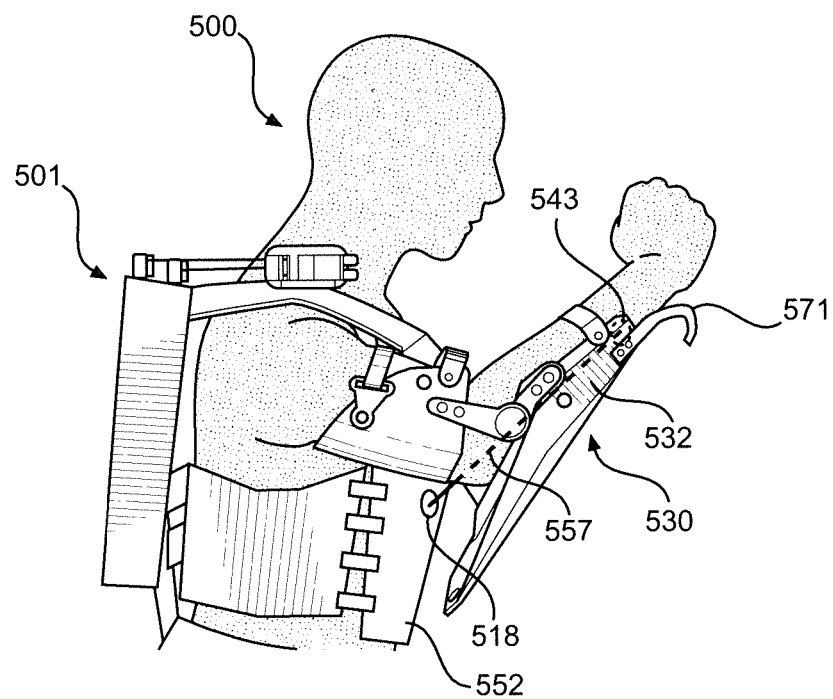
FIG. 5A shows a person wearing the device of the fourth embodiment of the present invention.

The device of the fourth embodiment of the present invention is shown in FIG. 5A. A person 500 is shown wearing an upper body exoskeleton 501, which is equipped with the device of the second embodiment of the present invention. A forearm structure (or brace) 532 of an elbow (or arm) brace 530 is affixed to a rigid hook 571, allowing power from a winch located within a chest structure 552 (not visible) to be transmitted from a fixed point 518, through a tensile member 557, to a tensile member attachment point 543, to forearm structure 532, and into rigid hook 571, allowing transmission of large amounts of force across tensile member 557.

In some embodiments, hook 571 is a high-friction surface suited to climbing metal or smooth cement. In other embodiments, hook 571 is sharp and suited to climbing wood or soft materials. In some embodiments, hook 571 is co-located so as to match the curvature of the fifth digit of the hand (i.e., the little or "pinky" finger), allowing both hook 571 and the fingers to interact with the same climbing surface. In other embodiments, hook 571 is another type of tool, including but not limited to an entrenching tool, ice axe, climbing ascender, hammer, or blade.

Figure 5B:
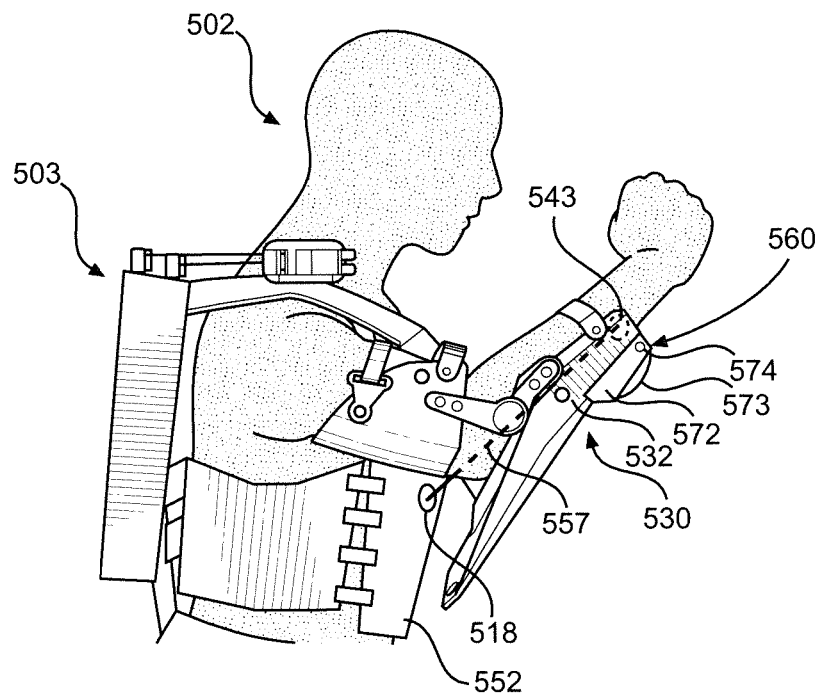
FIG. 5B shows a person wearing a folding variant of the fourth embodiment, with the device being shown in the closed position.
Figure 5C:
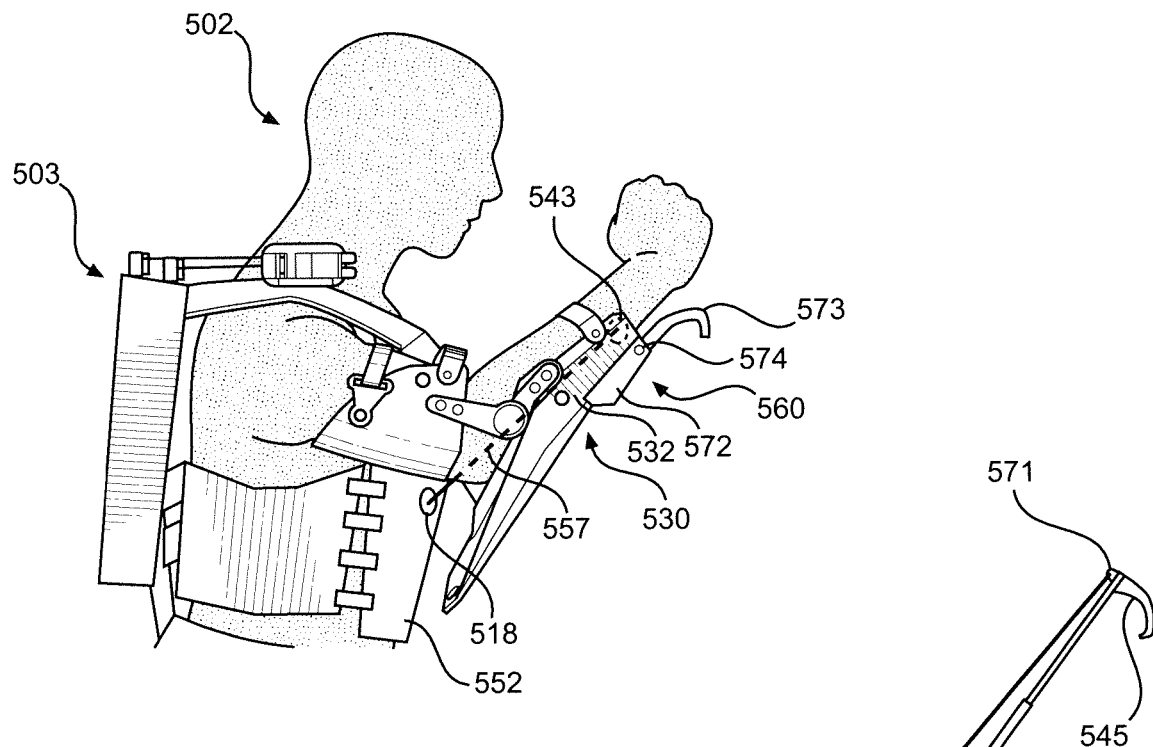
FIG. 5C shows a person wearing a folding variant of the fourth embodiment, with the device being shown in the open position.

In some variations of the fourth embodiment of the present invention, the hook or tool folds out and locks into position, using mechanisms for opening and closing like those seen in various pocket knife designs or other folding mechanisms known in the art. Such an embodiment is shown in FIGS. 5B and 5C, where a person 502 is wearing an exoskeleton 503 with a folding hook 560 mounted on forearm structure 532. Folding hook 560 has a folder body 572, a pivot 574, and a hook 573. FIG. 5B shows folding hook 560 in a closed position, and FIG. 5C shows folding hook 560 in an open position. The length of such a folding tool can be extended and is generally limited only by the length of forearm structure 532 if it is desirable for the folded tool to be maximally compact when folded.

In some embodiments, the folding tool uses mechanisms like those seen in folding knives to lock the folding tool in open or closed positions or to assist in the opening of the folding tool, including but not limited to liner locks, friction locks, spring assist mechanisms, or catch-hook devices as seen in U.S. Pat. No. 5,878,500. In some embodiments, multiple types of tools are selectively deployable as needed by the wearer for climbing or other activities, not unlike folding multitool or Swiss army-style tools.

Figure 5D:
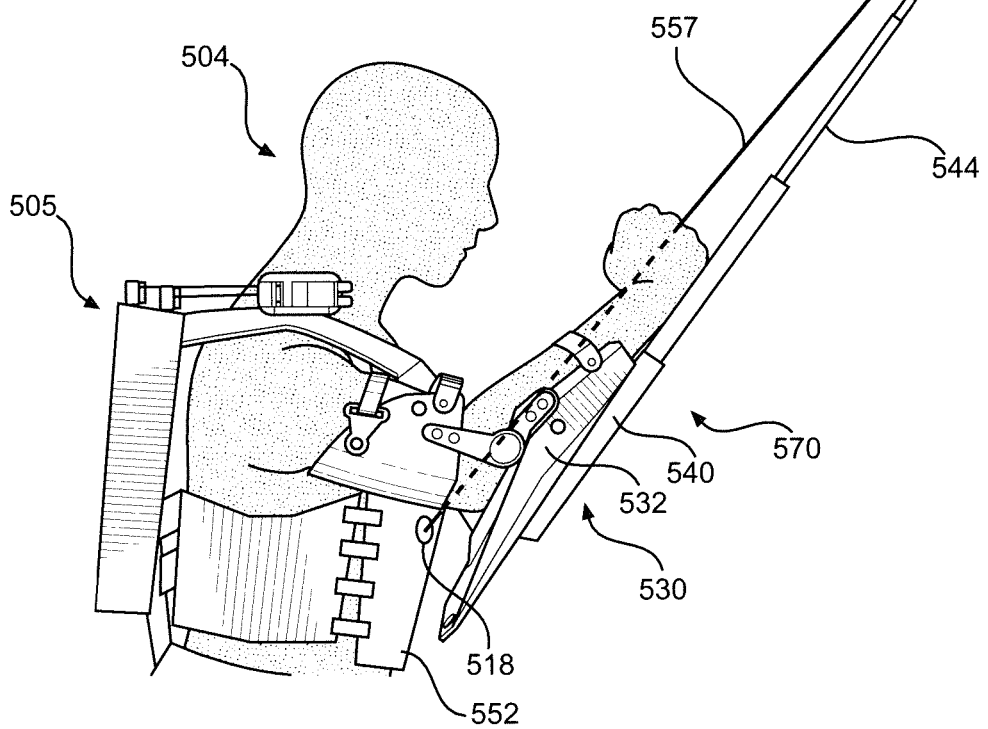
FIG. 5D shows a person wearing a telescoping variant of the fourth embodiment, with the device being shown in the elongated position and having a tensile attachment point at the terminus of the telescoping extension.
Figure 5E:
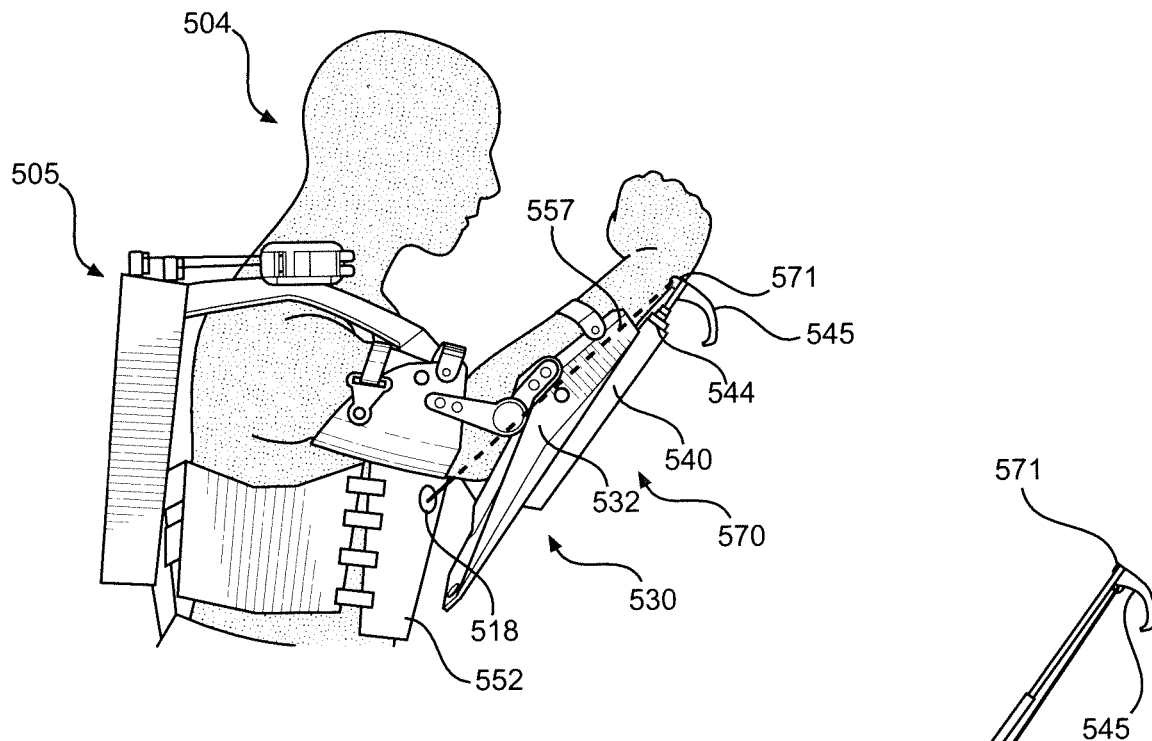
FIG. 5E shows a person wearing a telescoping variant of the fourth embodiment, with the device being shown in the retracted position and having a tensile attachment point at the terminus of the telescoping extension.

In other variations of the fourth embodiment of the present invention, mechanisms other than folding (e.g., telescoping) are used to reduce or extend the length of the tool. One such embodiment is shown in FIGS. 5D and 5E, where a person 504 is wearing an exoskeleton 505, with forearm structure 532 of exoskeleton 505 having a telescoping tool 570. Telescoping tool 570 has a tool body 540, a telescoping length 544, a hook 545, and a telescoping tensile member attachment point 571. FIG. 5D shows telescoping tool 570 in an extended position, and FIG. 5E shows telescoping tool 570 in a retracted position. In this embodiment, tensile member 557 is attached to the end of telescoping tool 570 rather than forearm structure 532, as shown in FIGS. 5A-C, allowing hook 545 and tensile member 557 to reach farther than the arms of person 540 could in absence of this device.

In some embodiments, the winch is strong enough to lift person 504 and exoskeleton 505, allowing person 504 to climb structures or objects using attachment points beyond arm's reach. In some embodiments, the extension of telescoping tool 570 is unpowered, making use of a swing and friction lock device, like that seen in collapsible police batons, or other mechanisms known in the art. In other embodiments, the extension of telescoping tool 570 is powered by any of a plurality of means known in the art.

In some embodiments, tensile member 557 is routed inside telescoping length 544 of telescoping tool 570 to minimize tangles. In some embodiments, hook 545, or another end fixture of telescoping tool 570, is foldable when telescoping tool 570 is retracted to make telescoping tool 570 more compact. In some embodiments, telescoping length 544 is not present, and hook 545 and tensile member 557 are thrown or otherwise projected, like a grappling hook, with the chest-mounted winch being used to lift exoskeleton 505 to the point at which hook 545 is attached. In some embodiments, hook 545 is replaced with a carabiner or another coupling device.

Figure 5F:
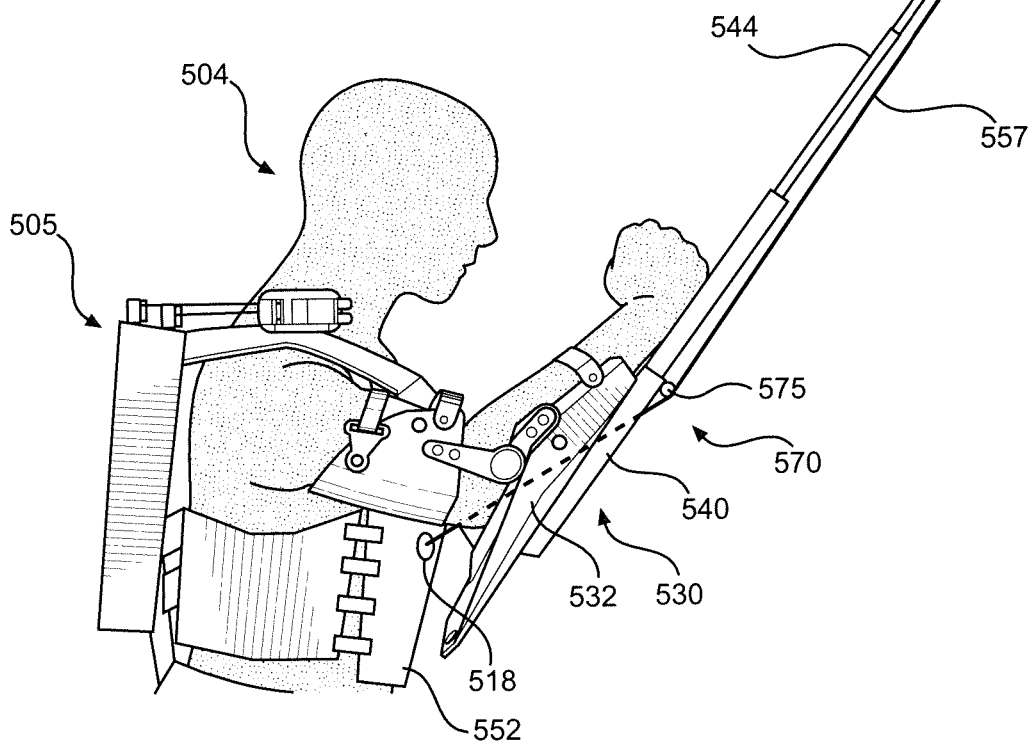
FIG. 5F shows a person wearing a telescoping variant of the fourth embodiment, with the device being shown in the elongated position and having a tensile attachment point at the terminus of the telescoping extension, and with the tensile member passing through a pulley near the wrist.

In some embodiments, tensile member 557 is routed through forearm structure 532 or over a pulley 575 affixed to forearm structure 532, as shown in FIG. 5F, to improve the use of this device in climbing.

As an example of the device of the fourth embodiment of the present invention, consider a soldier climbing up to the roof of a building in a combat situation while wearing heavy body armor and carrying substantial equipment weight. Through use of the device of the fourth embodiment, this solider can more quickly and easily ascend with less fatigue. In addition, this soldier can hold an object in his or her hands while climbing, providing a potential tactical advantage in some situations. Alternatively, the hook can be used in a pull-up motion, allowing the hands and wrists to be rolled over off the hook into a pushing motion by the hands on a surface, allowing for faster climbing.

In some embodiments, the various embodiments of the present invention can be combined. In all embodiments, various sensors, including but not limited to pressure sensors or toggle switches, can be in communication with the exoskeleton control system, allowing the exoskeleton to respond to the user. In some embodiments, the exoskeleton control system can control the activation of actuators or other powered components.

In some embodiments, there is no lower exoskeleton (e.g., legs). In such embodiments, it may be preferred that a harness connect the wearer to the upper body exoskeleton to brace the exoskeleton to the wearer's body for certain climbing activities. In other embodiments, the upper body powered exoskeleton is a component of an exoskeleton that also includes powered or unpowered exoskeleton legs. In some embodiments, the upper body of the exoskeleton can be selectively disconnected from the lower body of the exoskeleton.

In some embodiments, quick disconnects are incorporated into the ends of the tensile members, allowing the tensile members to be quickly connected or disconnected as desired by the exoskeleton wearer. Arm power is provided while the tensile members are connected, and disconnection of the tensile members reduces the chance of tangling in brush, for example. In embodiments where the tensile members are disconnectable, the same actuator can be used to power various embodiments (e.g., climbing or elbow extension). In such embodiments, the attachment points to the chest of the exoskeleton can be selected by routing the tensile members through pulleys or similar devices.

In some embodiments, the actuators and/or tensile member attachment points are placed differently on the exoskeleton structure. In some embodiments, the tensile members are routed differently across the exoskeleton structure, including the use of pulleys or devices effecting mechanical advantage.

Based on the above, it should be readily apparent that the present invention provides a device and method that allows an exoskeleton to power the movements of the human arm, with this device providing power in such a way as to not restrict the fine motions at the shoulder. Also, the device does not limit arm dexterity and does not add substantial weight or bulk to the arms. Although described with reference to preferred embodiments, it should be readily understood that various changes or modifications could be made to the invention without departing from the spirit thereof. In general, the invention is only intended to be limited by the scope of the following claims.

The invention claimed is:

1. An exoskeleton comprising:
an arm brace configured to be coupled to and extend across an elbow of an arm of a wearer;
a tensile member connected to the arm brace;
an actuator configured to exert a pulling force on the tensile member, wherein the pulling force reduces a length of the tensile member between the arm brace and the actuator and causes the arm of the wearer to bend at the elbow; and
a torso brace configured to be coupled to a torso of the wearer, wherein the actuator is coupled to the torso brace.

2. The exoskeleton of claim 1, further comprising a glove coupled to the arm brace.

3. The exoskeleton of claim 2, wherein the glove includes an inelastic palm structure.

4. The exoskeleton of claim 2, further comprising:
a first strap connecting the glove to the arm brace; and
a second strap connecting the glove to the arm brace.

5. The exoskeleton of claim 1, wherein:
the arm brace includes an upper arm brace configured to be coupled to an upper arm of the wearer;
the arm brace also includes a forearm brace configured to be coupled to a forearm of the wearer; and
the tensile member is connected to the forearm brace.

6. The exoskeleton of claim 1, wherein:
the arm brace includes an upper arm brace configured to be coupled to an upper arm of the wearer;
the arm brace also includes a forearm brace configured to be coupled to a forearm of the wearer; and
the tensile member is connected to the upper arm brace.

7. The exoskeleton of claim 1, wherein the torso brace includes a chest structure and a back structure, and the actuator is located within the chest structure or the back structure.

8. The exoskeleton of claim 1, further comprising a tensile member guide assembly configured to guide the tensile member.

9. The exoskeleton of claim 8, wherein the tensile member guide assembly is coupled to the torso brace.

10. The exoskeleton of claim 9, wherein the torso brace includes a shoulder structure, and the tensile member guide assembly is coupled to the shoulder structure.

11. The exoskeleton of claim 8, wherein the tensile member guide assembly includes a pivoting tensile member guide body having a horizontal or vertical guide configured to contact the tensile member.

12. The exoskeleton of claim 1, further comprising a second tensile member connected to the arm brace, wherein exerting a pulling force on the second tensile member also causes the arm of the wearer to bend at the elbow.

13. The exoskeleton of claim 1, wherein the actuator is a winch.

14. The exoskeleton of claim 13, further comprising an electric motor configured to drive the winch.

15. The exoskeleton of claim 1, wherein the actuator is a spring.

16. The exoskeleton of claim 1, further comprising a tool coupled to the arm brace.

17. The exoskeleton of claim 16, wherein the tool is a hook.

18. An exoskeleton comprising:
an arm brace configured to be coupled to and extend across an elbow of an arm of a wearer, the arm brace including an upper arm brace configured to be coupled to an upper arm of the wearer and a forearm brace configured to be coupled to a forearm of the wearer, wherein the forearm brace includes an elbow spur and a pulley connected to the elbow spur;
a tensile member connected to the upper arm brace and the tensile member is routed through the pulley; and
an actuator configured to exert a pulling force on the tensile member, wherein the pulling force reduces a length of the tensile member between the arm brace and the actuator and causes the arm of the wearer to bend at the elbow.

19. A method of providing assistance to an arm of an exoskeleton wearer, the method comprising: exerting a pulling force on a tensile member, connected to an arm brace coupled to and extending across an elbow of the arm of the wearer, with a torso brace configured to be coupled to a torso of the wearer and an actuator coupled to the torso brace, wherein the pulling force reduces a length of the tensile member between the arm brace and the actuator and causes the arm of the wearer to bend at the elbow.

* * * * *